(12) United States Patent
Arita

(10) Patent No.: US 8,102,644 B2
(45) Date of Patent: Jan. 24, 2012

(54) ELECTRONIC DEVICE

(75) Inventor: Shiro Arita, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 341 days.

(21) Appl. No.: 12/438,918

(22) PCT Filed: Aug. 24, 2007

(86) PCT No.: PCT/JP2007/066442
§ 371 (c)(1),
(2), (4) Date: Sep. 11, 2009

(87) PCT Pub. No.: WO2008/023788
PCT Pub. Date: Feb. 28, 2008

(65) Prior Publication Data
US 2009/0323262 A1 Dec. 31, 2009

(30) Foreign Application Priority Data
Aug. 25, 2006 (JP) .................................. 2006-229935

(51) Int. Cl.
*G06F 1/16* (2006.01)
(52) U.S. Cl. ................. 361/679.01; 455/575.1; 361/788
(58) Field of Classification Search .................. 361/788; 455/575.1
See application file for complete search history.

(56) References Cited

U.S. PATENT DOCUMENTS

| 5,461,256 A | 10/1995 | Yamada et al. ............... 257/679 |
| 6,587,097 B1 * | 7/2003 | Aufderheide et al. ........ 345/173 |
| 6,882,596 B2 | 4/2005 | Guanter et al. |
| 7,224,343 B2 * | 5/2007 | Rekimoto ..................... 345/156 |
| 7,891,828 B2 * | 2/2011 | Nakamura ..................... 362/23 |
| 8,031,273 B2 * | 10/2011 | Yabuta et al. .................. 349/12 |
| 2003/0123329 A1 | 7/2003 | Guanter et al. ................. 368/82 |
| 2005/0020325 A1 * | 1/2005 | Enger et al. ................. 455/575.3 |
| 2006/0001655 A1 | 1/2006 | Tanabe .......................... 345/176 |

FOREIGN PATENT DOCUMENTS

| JP | 06-143884 | 5/1994 |
| JP | 06143884 A | 5/1994 |
| JP | 2004-028979 | 1/2004 |
| JP | 2004028979 A | 1/2004 |
| JP | 2005-522797 | 7/2005 |
| JP | 2006-049271 | 2/2006 |
| WO | WO 03/088176 A1 | 10/2003 |

* cited by examiner

*Primary Examiner* — Lisa Lea Edmonds
(74) *Attorney, Agent, or Firm* — DLA Piper LLP (US)

(57) ABSTRACT

An electronic device having a small size and improved in sensing ability is provided. A mobile phone 1 includes a first housing 2 having a housing opening 2h; a connector 67 arranged inside the first housing 2; a reinforcing frame 31 arranged to face the housing opening 2h to cover the connector 67; a sensor board 39 arranged on a surface facing the housing opening 2h of the reinforcing frame 31; and a touch sensor electronic 47 arranged on a surface facing the housing opening 2h of the sensor board 39. The reinforcing frame 31 has a recess 31d in a region which corresponds to the touch sensor electrode 47 and the connector 67.

8 Claims, 13 Drawing Sheets

FIG. 1A
FIG. 1B
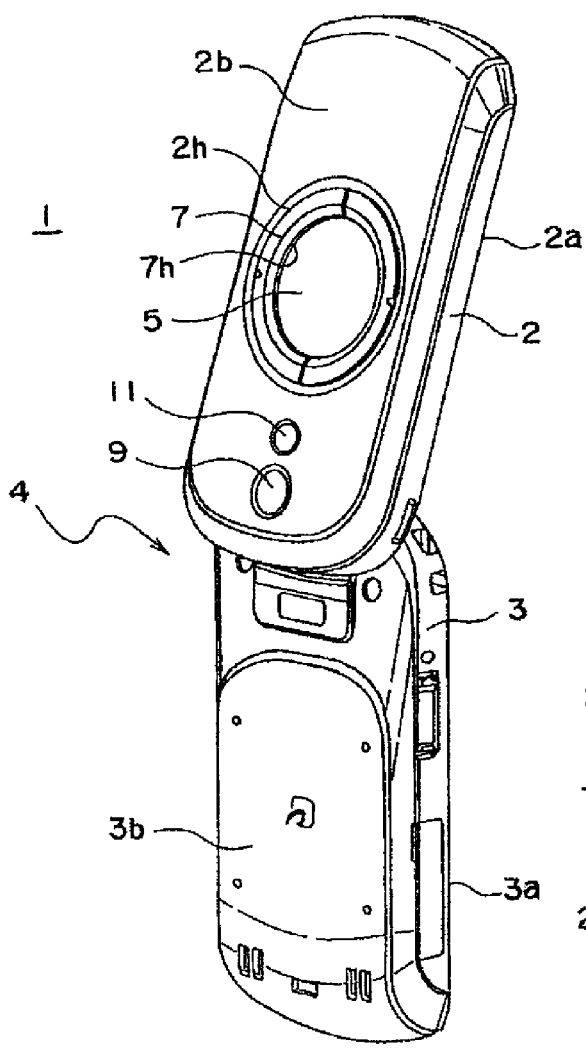
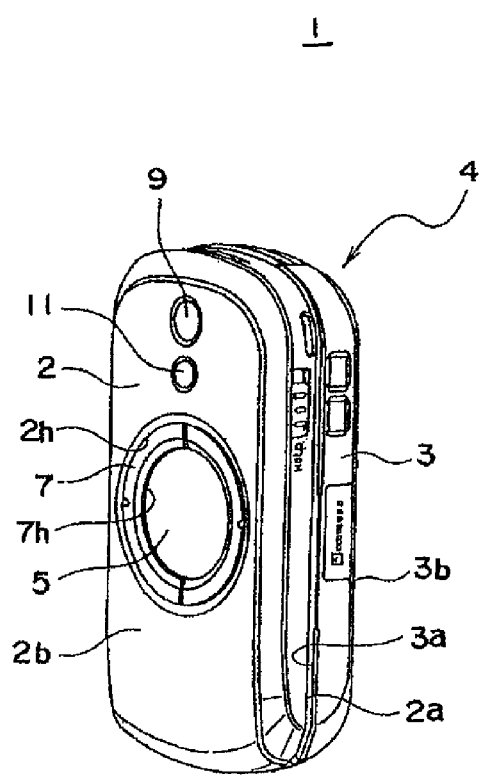

US 8,102,644 B2

ELECTRONIC DEVICE

TECHNICAL FIELD

The present invention relates to a mobile phone, PDA (Personal Digital Assistant), portable music player, digital camera, notebook personal computer, printer, or other electronic device.

BACKGROUND ART

Patent Document 1 discloses a mobile phone provided with a touch sensor. The touch sensor detects presence of an operation by utilizing, for example, a change of an electric field at the periphery of the touch sensor and a change of an electrostatic capacitance of the touch sensor when a finger approaches the touch sensor.

Patent Document 1: Japanese Patent Publication (A) No. 2005-522797

DISCLOSURE OF THE INVENTION

Problem to be Solved by the Invention

When a touch sensor as described in Patent Document 1 is assembled into a small-sized electronic device like a portable electronic device, metal and other members having a high dielectric constant (permittivity) will be arranged in the vicinity of the touch sensor. Further, these members are liable to exert an influence upon the electric field around the touch sensor and cause malfunctions of the touch sensor and a drop in the sensing ability. The malfunctions and drop in the sensing ability can be eliminated by separating members having a high dielectric constant from the touch sensor in distance, but the electronic device becomes large in size in this case.

Accordingly, an electronic device having a small size and an improved sensing ability is preferably provided.

Means for Solving the Problem

An electronic device of the present invention includes a case member having an opening; an electronic component arranged inside the case member; a frame member arranged to face the opening to cover the electronic component; a first circuit board arranged on a surface facing the opening of the frame member; and an electrode for an electrostatic capacity type touch sensor provided on a surface facing the opening of the first circuit board, wherein the frame member has a recess in a region corresponding to at least one of the electrode and the electronic component.

Preferably, the frame member is formed by a resin, and a solid member having a smaller dielectric constant than that of the frame member is arranged in the recess.

Preferably, the recess is formed in the surface on the side where the first circuit board is arranged of the frame member, and the solid member is arranged so that its surface becomes the same plane as the surface of the frame member.

Preferably, the device further has a switch member arranged on the surface facing the opening of the first circuit board and an operating member arranged to be exposed from the opening and arranged to face the switch member and the electrode, wherein the recess is arranged in a region which does not correspond to the switch member of the frame member.

Preferably, the frame member has a plate portion which is arranged separated from the electronic component to the opening side, and the recess is formed in the plate portion.

Preferably, the recess is formed at a position corresponding to the electrode on a surface on the side facing the opening of the plate portion.

Preferably, the recess is formed at a position corresponding to the electronic component on a surface on the side facing the electronic component of the plate portion.

Preferably, the device has a second circuit board which is arranged inside the case member and has the electronic component arranged at a position facing the opening, wherein the frame member is arranged on a surface on the side facing the opening of the second circuit board.

Effect of the Invention

According to the present invention, the electronic device is made smaller in size and the sensing ability is improved.

BRIEF DESCRIPTION OF THE DRAWINGS

FIG. 1 Perspective views showing an appearance of a mobile phone according to an embodiment of the present invention.

EXPLANATION OF NOTATIONS

Figure 2:
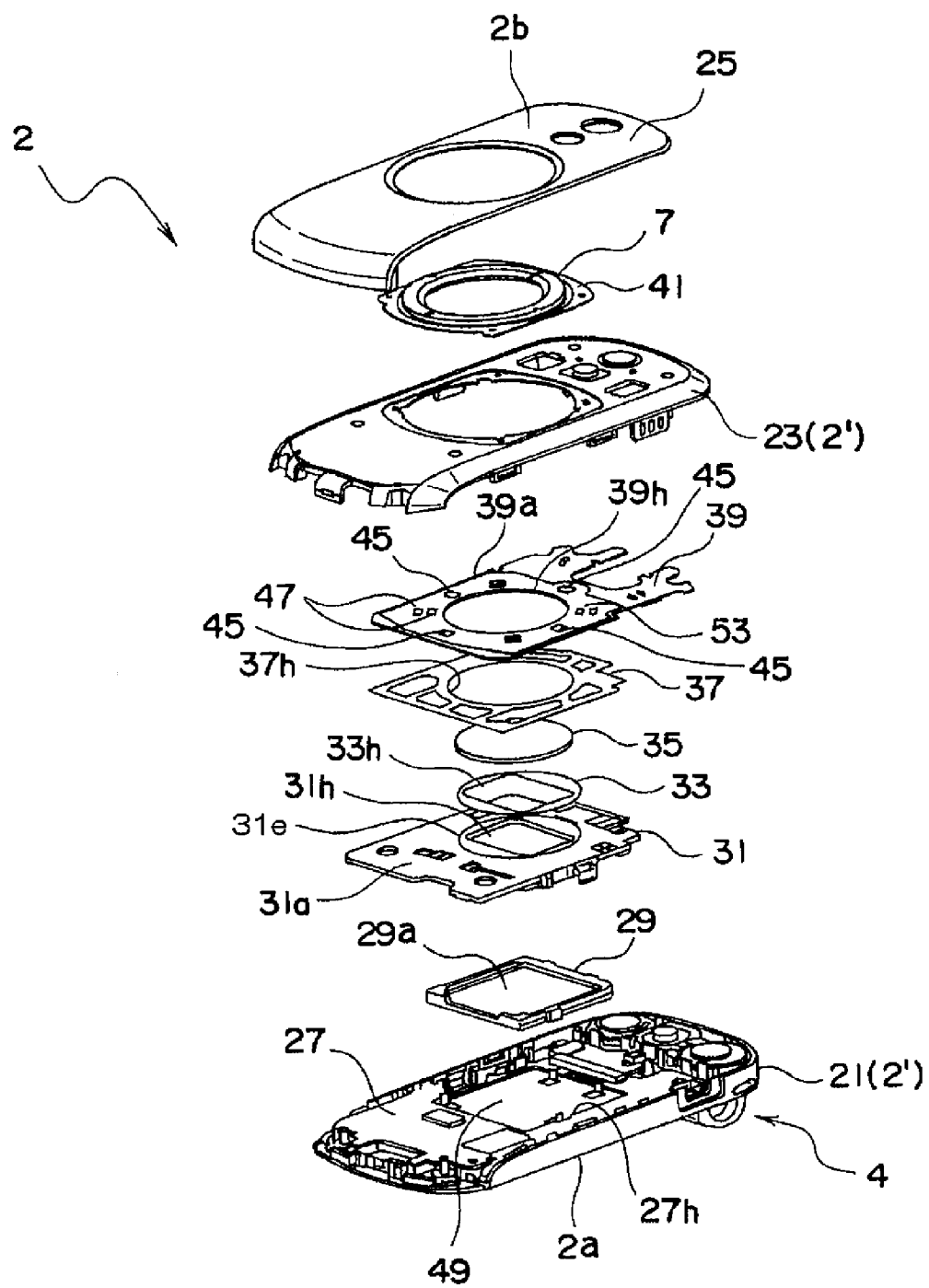
FIG. 2 A disassembled perspective view of a first housing of the mobile phone of FIG. 1.

1 . . . mobile phone (electronic device), 2 . . . first housing (case member), 2' . . . third housing (case member), 2h . . . housing opening (opening), 7 . . . ring key (operating member), 7c . . . inclined surface (chamfered surface), 23 . . . rear case, 23h . . . case opening, 25 . . . decorative panel (cover member), 25h . . . panel opening (cover opening), 27 . . . display board (second circuit board), 29 . . . sub-display device (display element, display device), 29a . . . display surface, 31 . . . reinforcing frame (frame member), 31a . . . plate portion, 31d . . . recess, 31h . . . frame opening, 35 . . . trim plate (decorative member, light transmission member), 39 . . . sensor board (first circuit board), 39h . . . board opening, 41 . . . key sheet (sheet member), 41c . . . clamped portion, 41d . . . abutment portion, 45 . . . dome switch (tact switch), 45a . . . movable contact (switch member), 45c . . . fixed contact (switch member), 47 ... touch sensor electrode, 48 ... touch sensor (electrostatic capacity type sensor), 67 ... connector (electronic component), and 69 ... IC (electronic component).

BEST MODE FOR CARRYING OUT THE INVENTION

FIG. 1 are perspective views showing an appearance of a mobile phone 1 as an electronic device according to an embodiment of the present invention, in which FIG. 1A is a perspective view showing an open state, and FIG. 1B is a perspective view showing a closed state.

The mobile phone 1 is configured as a so-called flip-open type mobile phone and is provided with a first housing 2 and a second housing 3 which are connected so that they can pivot relative to each other between the open state and the closed state.

The first housing 2 and the second housing 3 configure a housing of an overall mobile phone 1 by connection by a connection portion 4 around which their end portions pivot. The first housing 2 and the second housing 3 are formed to generally thin box shapes. In the closed state, these are superimposed on each other so that their contours generally match.

The first housing 2 has a facing surface 2a facing the second housing 3 in the closed state and a back surface 2b which becomes the back surface thereof. The first housing 2 is provided with, for example, a speaker 107 (see FIG. 13) for speech which emits sound from a not shown sound emission port formed in the facing surface 2a, a main display 6 (see FIG. 8) displaying an image or text on the facing surface 2a, a sub-display 5 displaying an image or text on the back surface 2b, a ring key (operating member) 7 provided on an outer circumference of the sub-display 5 and operated by the user, a camera 9 capturing an image from the back surface 2b, and a flash 11 illuminating the back surface 2b side.

A housing opening 2h is formed in the back surface 2b. The ring key 7 is exposed from the housing opening 2h. The sub-display 5 is exposed from the key opening 7h of the ring key 7. The shape of the housing opening 2h and key opening 7h is for example circular.

The second housing 3 has a facing surface 3a facing the first housing 2 in the closed state and a back surface 3b which becomes the back surface thereof. The second housing 3 is provided with, for example, a microphone 108 (see FIG. 13) for speech which picks up sound from a not shown sound collection port formed in the facing surface 3a, a transmission/reception use built-in antenna 105 (see FIG. 13) for wireless communications utilizing radio waves, and a not shown dial key arranged on the facing surface 3a and operated by the user.

FIG. 2 is a disassembled perspective view of the first housing 2. An upper side of a sheet surface of FIG. 2 is the back surface 2b side, and a lower side of the sheet surface is the facing surface 2a side.

The first housing 2 has a front case 21 constituting the facing surface 2a, a rear case 23 which is fixed to the front case 21 to house a variety of electronic components with the front case 21, and a decorative panel 25 which is placed over the rear case 23 and constitutes the back surface 2b. Note that the first housing 2 can be regarded as being configured by covering a third housing 2' having the front case 21 and the rear case 23 with the decorative panel 25 as well.

Between the front case 21 and the rear case 23, from the front case 21 side, a main display device 49, display board 27, sub-display device 29, reinforcing frame 31, two-sided tape 33, trim plate (light transmission member) 35, two-sided tape 37, and sensor board 39 are arranged stacked in that order (strictly speaking partially in parallel). Between the rear case 23 and the decorative panel 25, a key sheet 41 and the ring key 7 are integrally arranged stacked over each other. On a mounting surface 39a of the sensor board 39 on the rear case 23 side, a plurality of dome switches 45 and touch sensor electrodes 47 detecting the operation of the user via the ring key 7 and light emitting elements 53 illuminating the ring key 7 are provided. Note that the sub-display device 29 and the trim plate 35 constitute the sub-display 5.

The front case 21, rear case 23, and decorative panel 25 are formed by for example a resin. The front case 21 and the rear case 23 are fixed to each other by, for example, screwing a not shown screw inserted through the one of the cases into a not shown screw boss provided on other of cases. By fixing the front case 21 and the rear case 23 to each other, the main display device 49, display board 27, sub-display device 29, reinforcing frame 31, and sensor board 39 are clamped together by the front case 21 and rear case 23 in a state stacked over each other (strictly speaking a state where they are partially arranged in parallel).

The main display device 49 is configured by for example an organic EL display or a liquid crystal display. The main display device 49 configures the main display 6 and has a display surface 49a (see FIG. 8) facing an inner surface of the facing surface 2a of the front case 21. Note that FIG. 2 shows a state where a portion of the back surface of the main display device 49 is exposed from the board opening 27h of the display board 27.

The display board 27 is constituted by for example a printed circuit board using a resin as a base. The display board 27 is provided with a control circuit etc. controlling operations of the main display device 49 and the sub-display device 29.

The display board 27 abuts against the inner side of the side surface of the front case 21 or rear case 23 or a not shown boss provided in the front case 21 or rear case 23 whereby it is positioned with respect to the front case 21 and the rear case 23 in a direction along the mounting surface. Further, the display board 27 abuts against a rib provided on the inner side surface of the front case 21 or the back surface of main display device 49 at a mounting surface on the front case 21 side and abuts against the reinforcing frame 31 at the mounting surface on the rear case 23 side whereby it is positioned with respect to the front case 21 and the rear case 23 in a direction perpendicular to the mounting surface.

The sub-display device 29 is configured by for example an organic EL display or a liquid crystal display. The sub-display device 29 has a display surface 29a facing the housing opening 2h. The sub-display device 29 is for example a thin box state. The display surface 29a is for example rectangular. The sub-display device 29 is inserted fit into the board opening 27h provided in the display board 27, and the back surface of the sub-display device 29 abuts against the back surface of the main display device 49.

Figure 3:
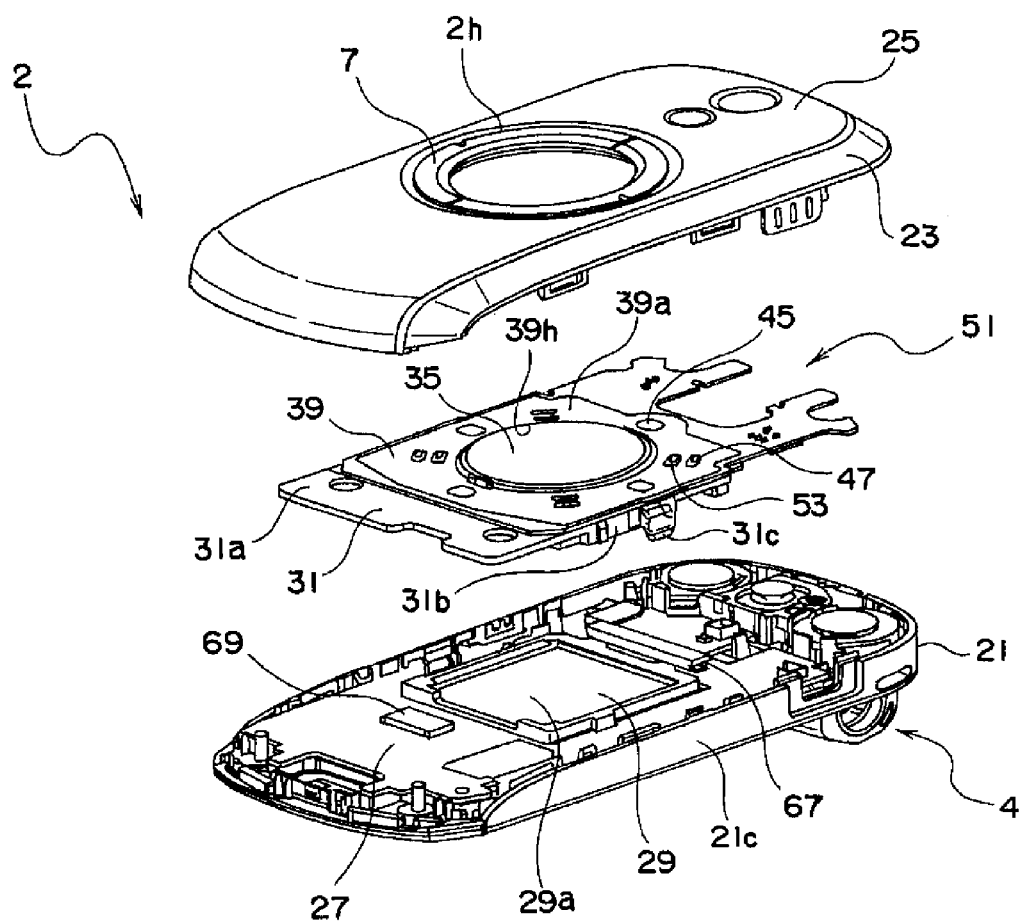
FIG. 3 A disassembled perspective view explaining a method of arrangement of a trim plate in the first housing of FIG. 2.

FIG. 3 is a disassembled perspective view explaining the method of arrangement of the trim plate 35. The trim plate 35 is a light transmission member provided for protecting the display surface 29a of the sub-display device 29 from dust, water, etc.

In a conventional mobile phone, a ring key is not provided at the periphery of the sub-display, and the trim plate is directly fixed to the rear case to cover the opening of the rear case. However, in the mobile phone 1, the ring key 7 is arranged at the periphery of the sub-display 5, therefore clearance for arranging the ring key 7 must be provided between the trim plate 35 and the housing opening 2h and it is difficult to directly fix the trim plate 35 to the rear case 23 or decorative panel 25.

Therefore, in the mobile phone 1, the trim plate 35 is fixed to the reinforcing frame 31 arranged between the rear case 23 and the sub-display device 29. Further, by clamping the reinforcing frame 31 between the front case 21 and the rear case 23, the trim plate 35 is indirectly fixed with respect to the rear case 23.

Figure 4:
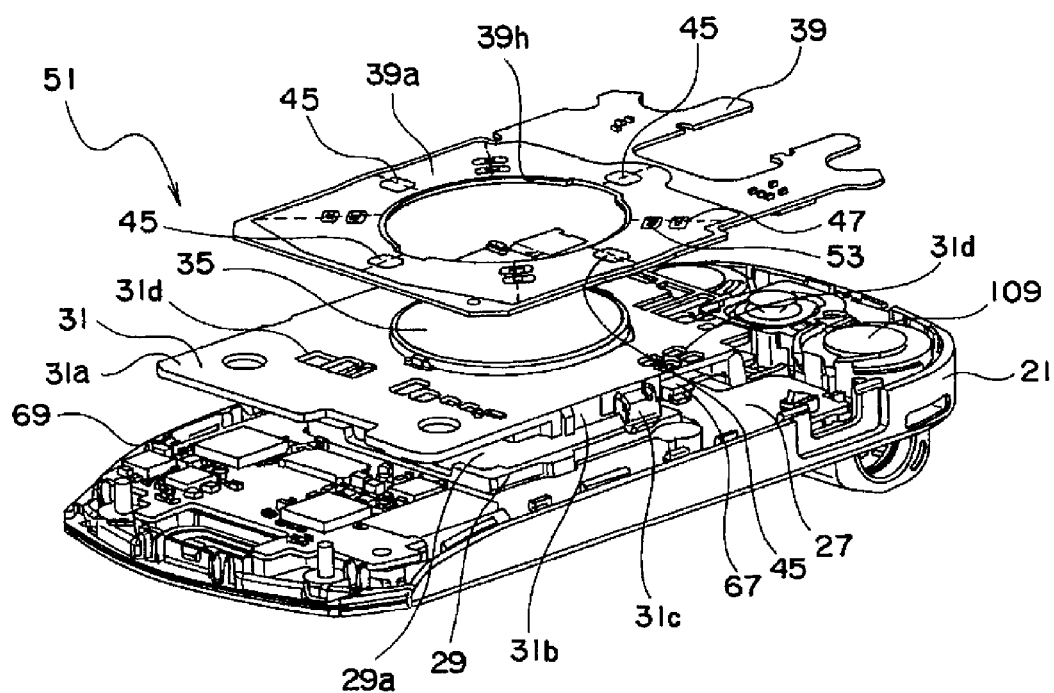
FIG. 4 A disassembled perspective view explaining a method of arrangement of a sensor board in the first housing of FIG. 2.

FIG. 4 is a disassembled perspective view explaining the method of arrangement of the sensor board 39.

The sensor board 39 is formed with a board opening 39h. The board opening 39h is shaped for example enabling the trim plate 35 to be fitted into it (for example approximately circular). The sensor board 39 is stacked over a surface of the reinforcing frame 31 facing the housing opening 2h with the trim plate 35 inserted into the board opening 39h. Accordingly, it becomes possible to arrange the sensor board 39 to face the inner side surface of the rear case 23 while exposing the display surface 29a of the sub-display device 29 through the trim plate 35. In other words, it becomes possible to arrange the dome switches (tact switches) 45 and touch sensor electrodes 47 to face the ring key 7 while exposing the display surface 29a.

Below, the combination of the reinforcing frame 31, trim plate 35, and sensor board 39 will sometimes be referred to as a "frame assembly 51".

Figure 5:
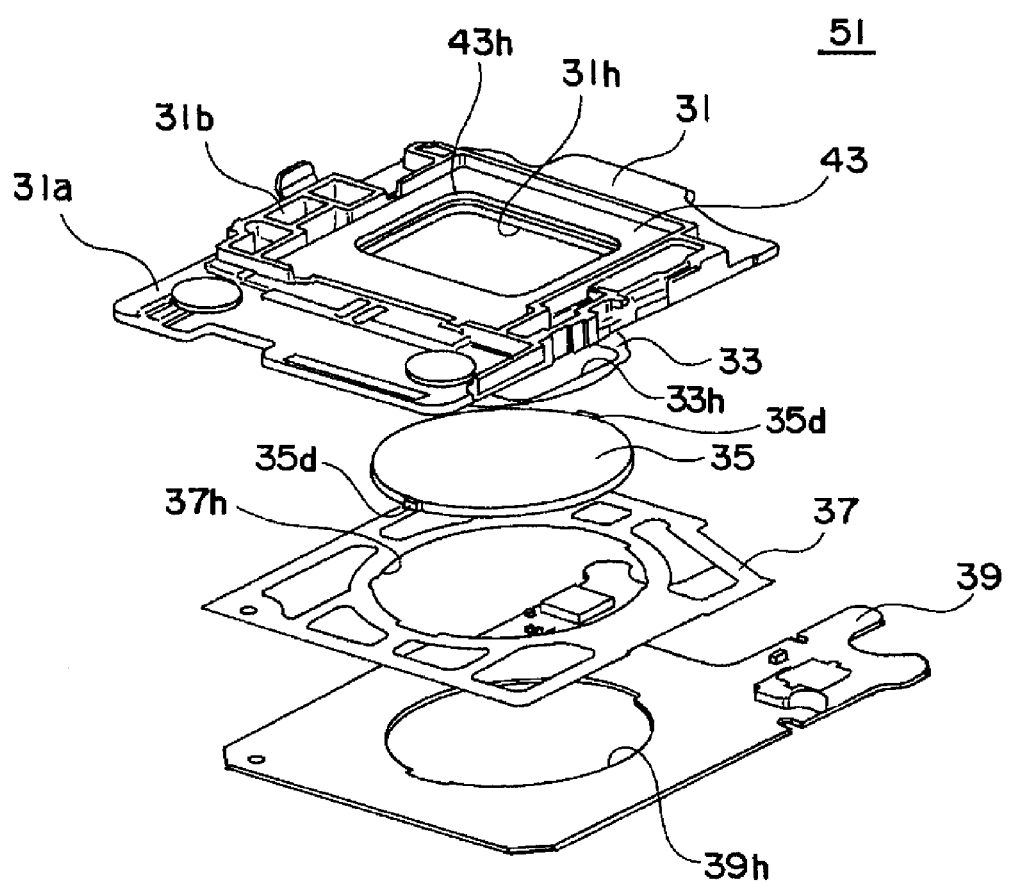
FIG. 5 A disassembled perspective view of a frame assembly in the first housing of FIG. 2.

FIG. 5 is a disassembled perspective view of the frame assembly 51. In FIG. 5, the top side of the sheet surface is the front case 21 side. Details of the frame assembly 51 will be explained with reference to FIG. 2 to FIG. 5.

The reinforcing frame 31 is formed by for example a resin. As shown in FIG. 3 to FIG. 5, the reinforcing frame 31 has a plate portion 31a facing the display board 27 and display surface 29a and a rib 31b projecting out from the plate portion 31a to the display board 27 side.

The plate portion 31a has for example an area wider than the sub-display device 29 and covers most of the display board 27. The plate portion 31a is formed with a frame opening 31h (FIG. 5) for exposing the display surface 29a to the housing opening 2h side. The frame opening 31h is formed to be for example rectangular, but may be suitably formed to be circular or elliptical according to need.

Figure 8:
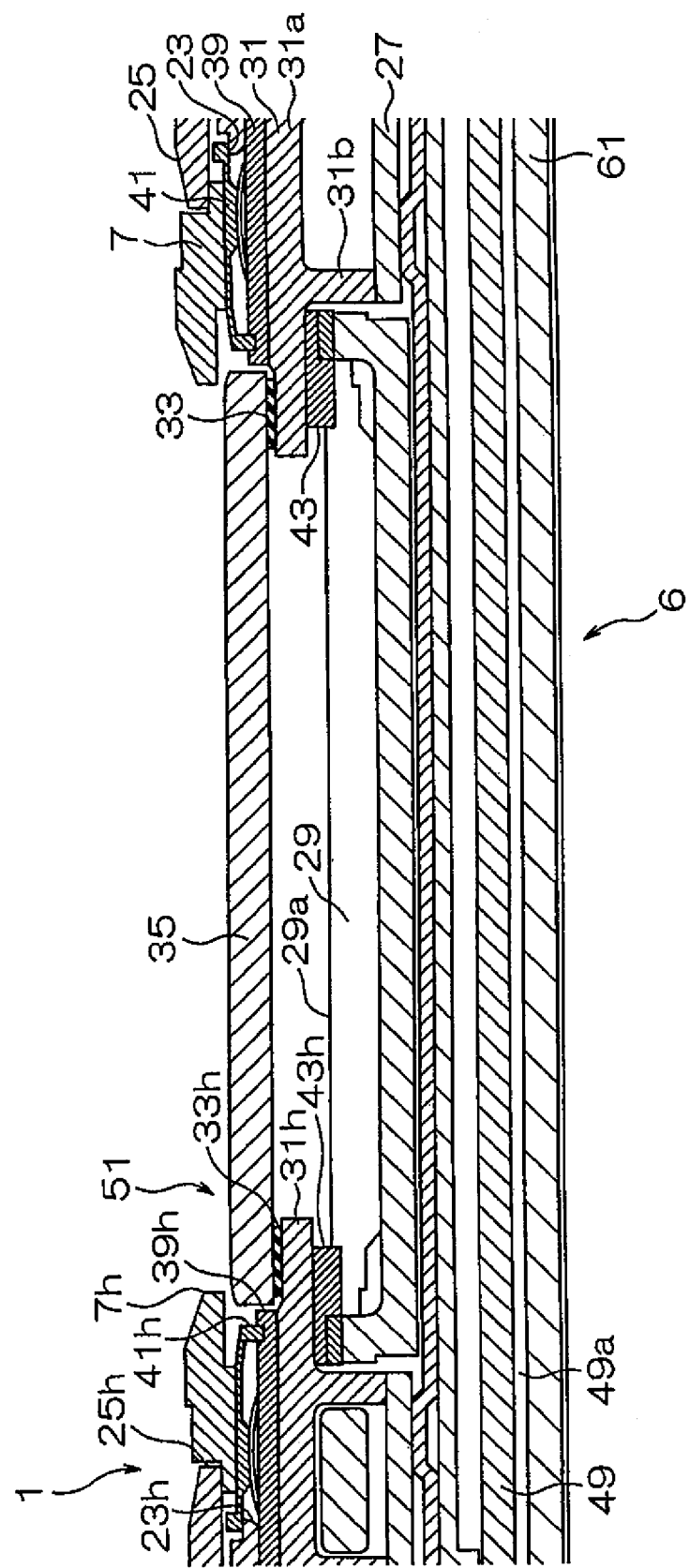
FIG. 8 An enlarged view of a region VIII of FIG. 7B.

The rib 31b abuts against the display board 27 and forms a space in which electronic components etc. can be arranged between the display board 27 and the plate portion 31a (see FIG. 8). The rib 31b is for example extended to surround the outer circumference of the sub-display device 29. Further, the rib 31b is extended along a portion of the outer circumferential edge of the plate portion 31a.

As shown in FIG. 2, the plate portion 31a has a recess 31e having approximately the same shape (for example substantially circular) as the trim plate 35 on the housing opening 2h side. The depth of the recess 31e is greater than the thickness of the two-sided tape 33, but smaller than the total thickness of the thickness of the two-sided tape 33 and the thickness of the trim plate 35.

As shown in FIG. 5, on the surface on the sub-display device 29 side of the plate portion 31a, a dust sheet 43 is arranged. The dust sheet 43 is constituted by an elastic member. The elastic member is for example a sponge or rubber. The dust sheet 43 is formed with a sheet opening 43h having substantially the same shape as the frame opening 31h. The outer edge of the dust sheet 43 has substantially the same shape (for example rectangular) as the sub-display device 29 and is positioned with respect to the reinforcing frame 31 by the rib 31b surrounding the sub-display device 29.

As shown in FIG. 2 and FIG. 5, the two-sided tape 33 for example has a shape of the outer edge (for example, substantially circular) which is substantially the same as the outer edge of the trim plate 35 and has a tape opening 33h of substantially the same shape (for example, substantially rectangular) as the frame opening 31h. The two-sided tape 33 is for example comprised of a rubber or other elastic member on which a binder is coated.

The trim plate 35 is formed by, for example, a resin, glass, ceramic, single crystal, etc. having a light transmission property. The shape of the trim plate 35 is for example a disk shape. A diameter of the trim plate 35 is smaller than the housing opening 2h, and a clearance enabling arrangement of the ring key 7 is formed between the trim plate 35 and the housing opening 2h. On the outer circumferential surface of the trim plate 35, positioning projections 35d (FIG. 5) project out in a radial direction.

As shown in FIG. 2 and FIG. 5, the two-sided tape 37 for example has a shape of the outer edge which is substantially the same as a portion of the sensor board 39 (for example rectangular with three sides coinciding with the sensor board 39) and has a tape opening 37h of substantially the same shape as the board opening 39h explained later (for example, substantially circular). The two-sided tape 37 is for example comprised of a rubber or other elastic member on which a binder is coated.

The sensor board 39 is constituted by, for example, a printed circuit board using a resin as the base. A diameter of the board opening 39h is greater than the trim plate 35, but smaller than the housing opening 2h. The dome switches 45, touch sensor electrodes 47, and light emitting elements 53 are provided on the periphery of the board opening 39h.

Specifically, as the dome switches 45, four switches in total are provided, i.e., two switches at the two sides of the board opening 39h in a long direction of the first housing 2 (direction from an end on the connection portion 4 side to the end on the opposite side) and two switches on the two sides of the board opening 39h in a short direction of the first housing 2. Light emitting elements 53 are arranged between dome switches 45, so four elements in total are provided. One touch sensor electrode 47 each is provided between each dome switch 45 and light emitting element 53, i.e., eight electrodes in total are provided. Namely, a plurality of dome switches 45 and touch sensor electrodes 47 are alternately arranged to surround the board opening 39h.

In the frame assembly 51 having the above components, the reinforcing frame 31 and the trim plate 35 are fixed to each other by the two-sided tape 33. At this time, the trim plate 35 is inserted fit in the recess 31e of the reinforcing frame 31 and is positioned with respect to the reinforcing frame 31. The trim plate 35 is positioned in the circumferential direction by fitting the projections 35d in hollows formed in the edge of the recess 31e.

Further, the reinforcing frame 31 and the sensor board 39 are fixed to each other by the two-sided tape 37. At this time, the sensor board 39 is positioned by the insertion of the trim plate 35 into the board opening 39h. The trim plate 35 is positioned in the circumferential direction by fitting the projections 35d in hollows formed in the edge of the board opening 39h.

Note that the trim plate 35 may also be fixed after fixing the sensor board 39 to the reinforcing frame 31. The recess 31e may have only a depth equal to the thickness of the two-sided tape 33, the trim plate 35 does not have to be positioned by the recess 31e.

Figure 6:
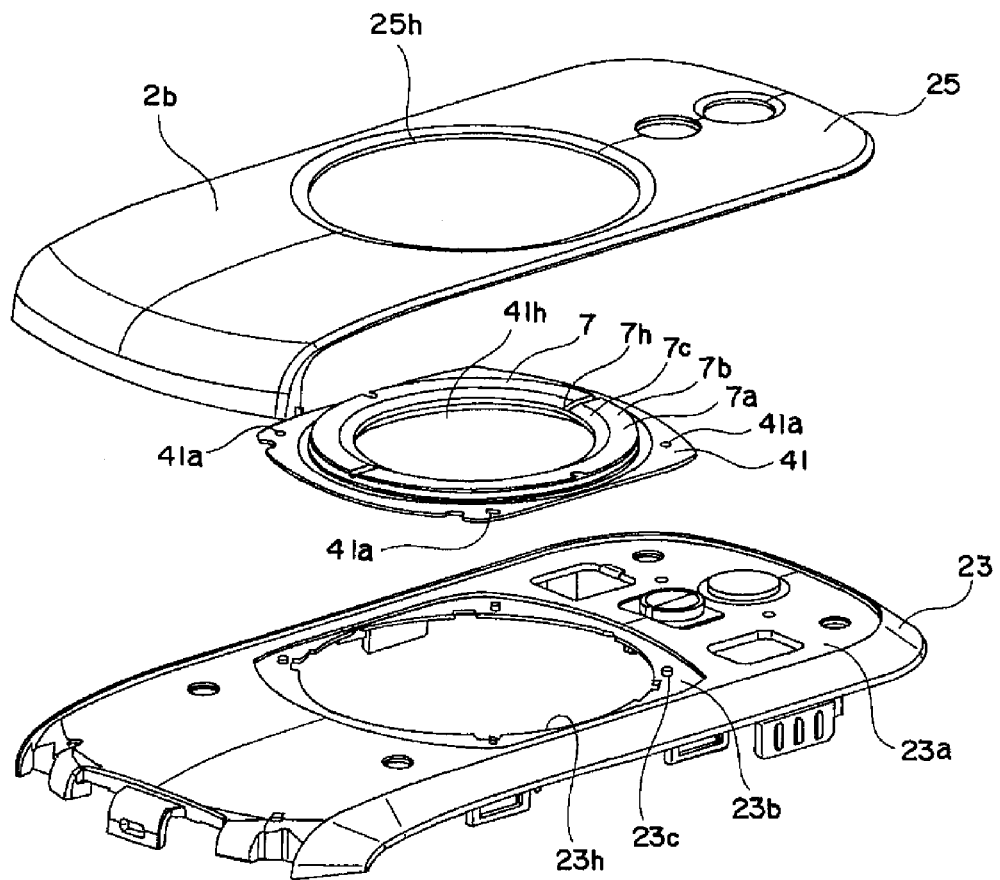
FIG. 6 A disassembled perspective view explaining a method of assembly of a ring key in the first housing of FIG. 2.

FIG. 6 is a disassembled perspective view explaining the method of assembly of the ring key 7.

The rear case 23 is formed to substantially a box state having a back surface and inclined side surfaces surrounding the periphery of the back surface. On the back side of the rear case 23, a panel-use recess 23a in which the decorative panel 25 is fit is formed. The depth of the panel-use recess 23a is equal to for example the thickness of the decorative panel 25. A bottom portion of the panel-use recess 23a is formed with a sheet-use recess 23b in which the key sheet 41 is fit. The depth of the sheet-use recess 23b is equal to for example the thickness of the key sheet 41. The bottom portion of the sheet-use recess 23b is formed with a case opening 23h for exposing the display surface 29a of the sub-display device 29. The case opening 23h is for example circular. Further, the bottom portion of the sheet-use recess 23b on the periphery of the case opening 23h is formed with a plurality of positioning projections 23c projecting out to the key sheet 41 side.

The key sheet 41 is formed by, for example, silicone rubber having a light transmission property. The key sheet 41 is formed in, for example, a rounded rectangular shape. The key sheet 41 is formed with a sheet opening 41h for exposing the display surface 29a of the sub-display device 29. The sheet opening 41h is for example circular. In the key sheet 41, the outer circumferential side from the attachment position of the ring key 7 is provided with a plurality of positioning holes 41a. The positioning holes 41a are provided at for example the four corners.

The decorative panel 25 is formed to, for example, a size and shape large enough to cover the entire back surface of the rear case 23 and the side surface of the end on the opposite side to the connection portion 4 (left side of the sheet surface of FIG. 6) of the rear case 23. Note that, the back surface of the decorative panel 25 constitutes the back surface 2b of the first housing 2. The decorative panel 25 is formed with a panel opening 25h for exposing the display surface 29a of the sub-display device 29. The panel opening 25h is for example circular.

The ring key 7 is formed by for example a resin such as ABS (acrylonitrile butadiene styrene) or PC (polycarbonate). The ring key 7 is fixed to the surface of the decorative panel 25 side of the key sheet 41 by a binder, two-sided tape, or other fixing means so that the key opening 7h and the sheet opening 41h are superimposed over each other. The key sheet 41 is arranged in the sheet-use recess 23b of the rear case 23 while positioned by the insertion of the positioning projections 23c of the rear case 23 into the positioning holes 41a. The decorative panel 25 is fit in the panel-use recess 23a of the rear case 23 for positioning and fixed by a binder to the rear case 23. The key sheet 41 is clamped by the rear case 23 and the decorative panel 25. The ring key 7 is exposed from the panel opening 25h. Note that the case opening 23h and the panel opening 25h constitute the housing opening 2h.

Figure 7A:
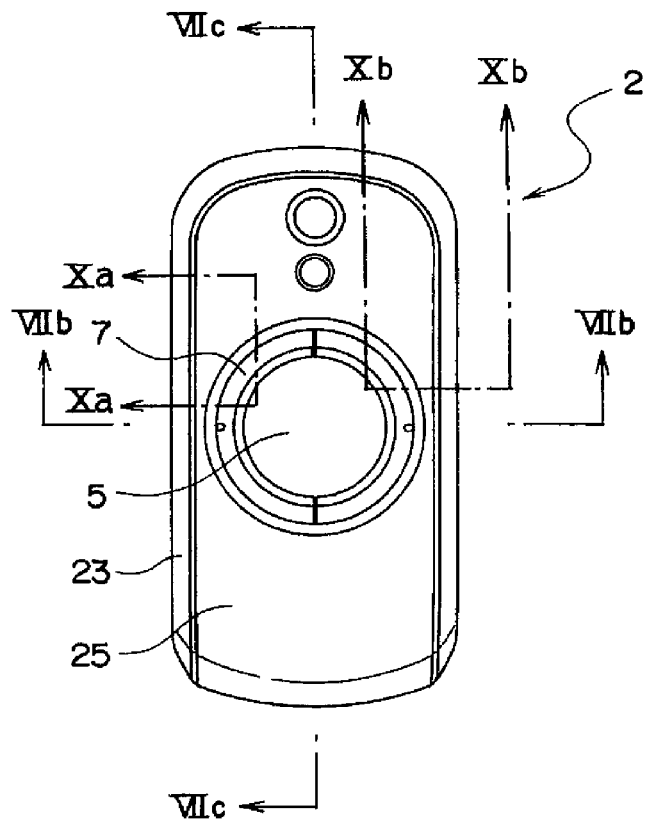
FIG. 7 A plan view and a sectional view of the first housing of FIG. 2.
Figure 7C:
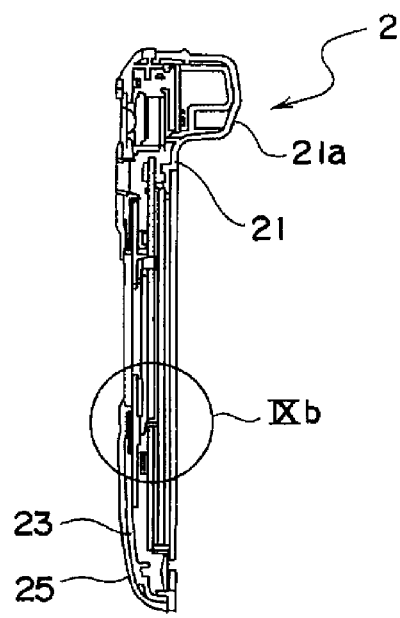
Figure 7B:
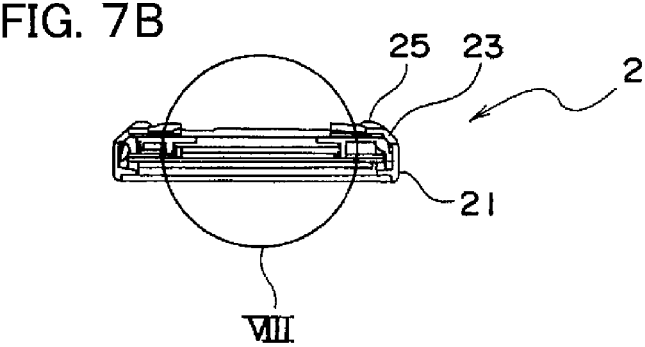

FIG. 7A is a plan view of the first housing 2, FIG. 7B is a sectional view taken along a VIIb-VIIb arrow direction of FIG. 7A, and FIG. 7C is a sectional view taken along a VIIc-VIIc arrow direction of FIG. 7A.

As shown in FIG. 7C, the front case 21 is formed with a projection 21a projecting out to the second housing 3 side. The projection 21a is fit in a not shown recess formed in the end of the second housing 3 to form the connection portion 4.

FIG. 8 is an enlarged view of a region VIII of FIG. 7B.

On the display surface 49a side of the main display device 49 (bottom side of the sheet surface of FIG. 8), a trim plate 61 having a light transmission property is arranged for protecting the display surface 49a. On the back surface side of the main display device 49 (top side of the sheet surface of FIG. 8), as explained above, the display board 27 and the sub-display device 29 are arranged.

On the display surface 29a of the sub-display device 29, as explained above, the dust sheet 43, reinforcing frame 31, two-sided tape 33, trim plate 35, two-sided tape 37 (not shown in FIG. 8), sensor board 39, rear case 23, key sheet 41, ring key 7, and decorative panel 25 are arranged stacked over each other. However, the two-sided tape 33 and trim plate 35 are arranged parallel with respect to the sensor board 39, rear case 23, key sheet 41, and decorative panel 25.

The display surface 29a is exposed at the back surface side of the first housing 2 through the sheet opening 43h, frame opening 31h, the tape opening 33h, the tape opening 37h (not shown in FIG. 8), board opening 39h, case opening 23h, sheet opening 41h (housing opening 2h), key opening 7h and panel opening 25h (housing opening 2h) formed at the each members, and trim plate 35 having a light transmission property.

Figure 9A:
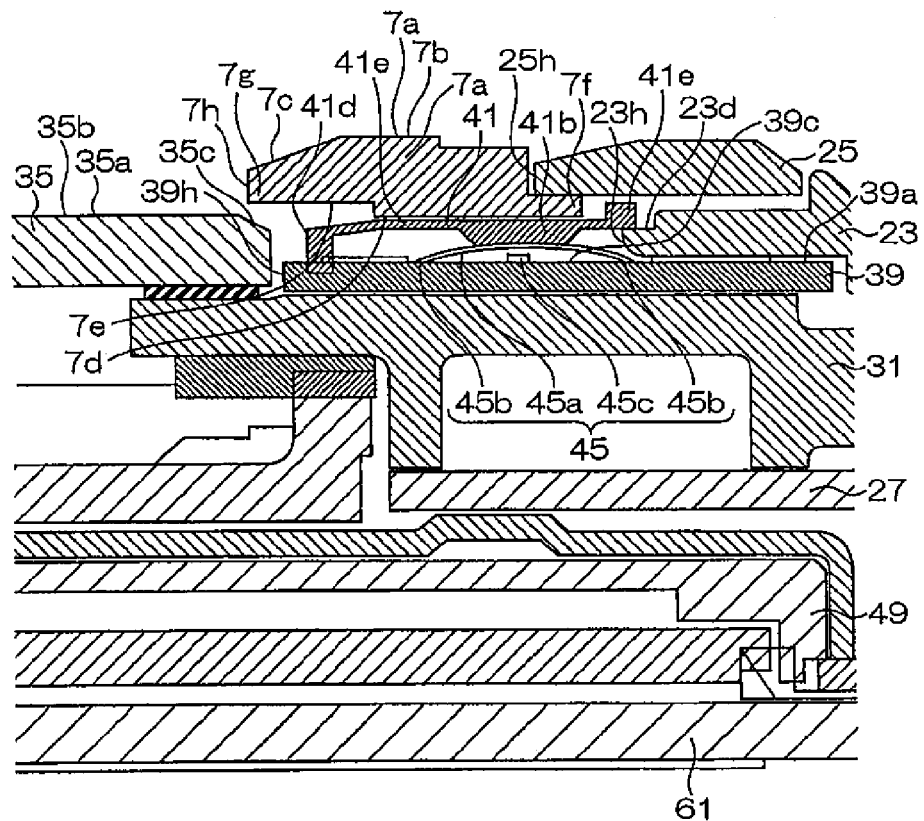
FIG. 9 A view enlarging a portion of FIG. 8 and an enlarged view of a region IXb of FIG. 7C.
Figure 9B:
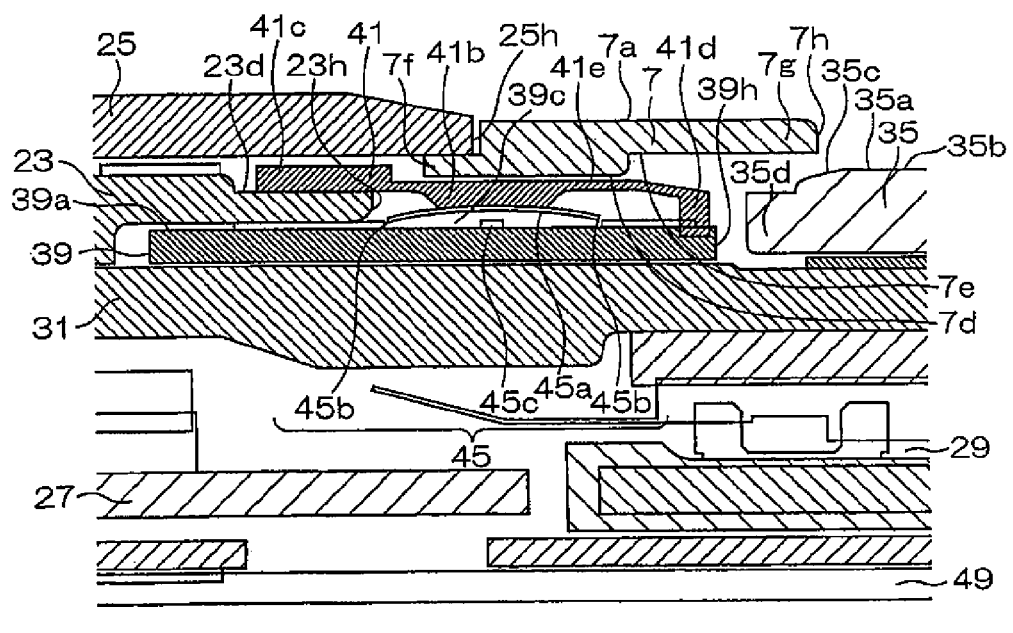
Figure 10A:
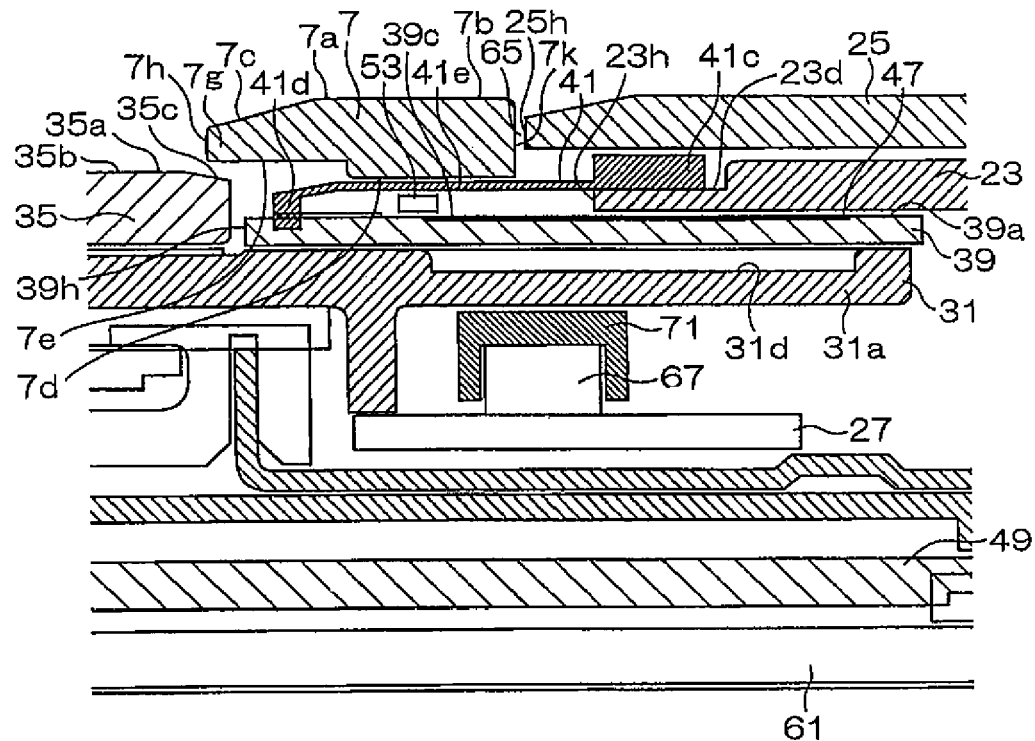
FIG. 10 A sectional view taken along an Xa-Xa arrow direction of FIG. 7A and a sectional view taken along an Xb-Xb arrow direction of FIG. 7A.
Figure 10B:
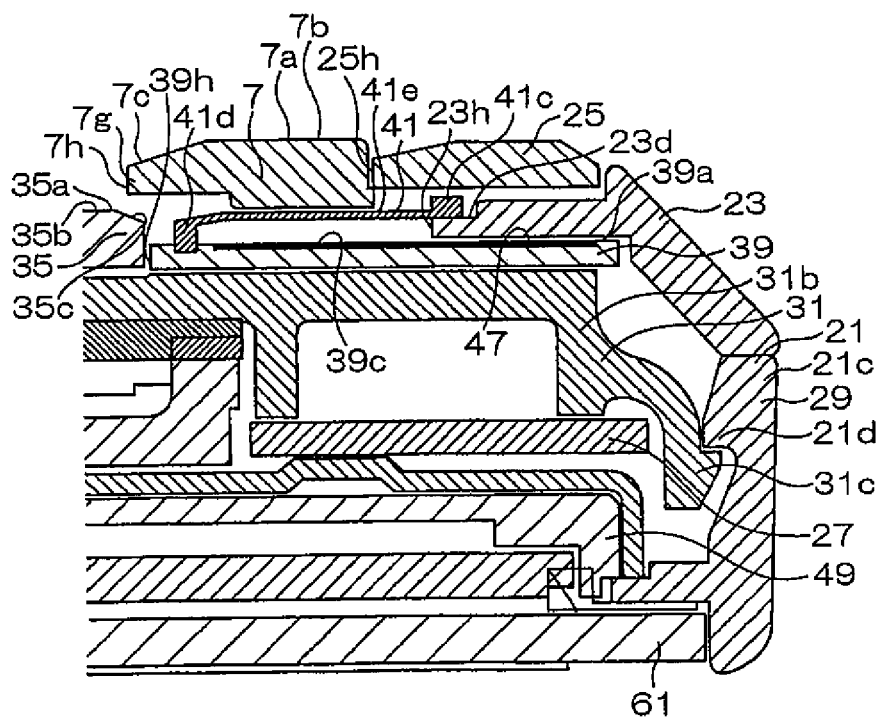

FIG. 9A is a view enlarging a portion of FIG. 8, FIG. 9B is a view enlarging a region IXb of FIG. 7C, FIG. 10A is a sectional view taken along an Xa-Xa arrow direction of FIG. 7A, and FIG. 10B is a sectional view taken along an Xb-Xb arrow direction of FIG. 7A.

The board opening 39h has a diameter larger than the trim plate 35, but smaller than the case opening 23h. Accordingly, the sensor board 39 has a ring-shaped region 39c located between the edge of the trim plate 35 and the edge of the case opening 23h on the periphery of the board opening 39h.

As shown in FIG. 9A and FIG. 9B, the dome switches 45 are provided at the ring-shaped region 39c of the mounting surface 39a of the sensor board 39. Each dome switch 45 has a movable contact 45a made of a dome-shaped metal sheet. An edge 45b of the movable contact 45a is connected to an electric conduction pattern of the sensor board 39. The sensor board 39 is provided with a fixed contact 45c at a position facing the center of the movable contact 45a. The movable contact 45a, when pressed against its projection direction, inverts and abuts against the fixed contact 45c while causing a "click" feeling. Due to this, the dome switch 45 is turned on. When the pressing force is released, the movable contact 45a separates from the fixed contact 45c due to its recovery force, and the dome switch 45 is turned off.

As shown in FIG. 10A and FIG. 10B, each touch sensor electrode 47 are provided across the ring-shaped region 39c and the outer circumferential side of the ring-shaped region 39c of the sensor board 39. The touch sensor electrode 47 is for example an electrode configuring the electrostatic capacity type touch sensor 48 (see FIG. 13). The touch sensor electrode 47, although not particularly shown, has a first electrode arranged along the sensor board 39 and a second electrode arranged to face the first electrode across a dielectric body. When the finger of the user approaches the touch sensor electrode 47, the finger of the user functions as a ground (or as the dielectric body), whereby the electrostatic capacitance between the first electrode and the second electrode changes. The touch sensor 48 detects the operation of the user by detecting the change of that electrostatic capacitance. Note that, a circuit detecting the change of the electrostatic capacitance is provided at for example an appropriate position of the sensor board 39.

As shown in FIG. 9A, FIG. 9B, FIG. 10A, and FIG. 10B, the key sheet 41 is arranged to cover most of the outer circumferential side of the ring-shaped region 39c of the sensor board 39. Namely, the outer edge of the key sheet 41 is located at the outer circumferential side from the case opening 23h of the rear case 23, and the inner edge of the key sheet 41 is located at the outer circumferential side of the board opening 39h and at the inner circumferential side from the dome switches 45 and the touch sensor electrodes 47.

On the outer edge side of the key sheet 41, a clamped portion 41c which is clamped between the bottom portion of the sheet-use recess 23b of the rear case 23 and the decorative panel 25 is formed. The clamped portion 41c is clamped across the outer circumferences of the case opening 23h and the panel opening 25h. In other words, the clamped portion 41c is formed in a ring-shaped state to surround the case opening 23h and the panel opening 25h. The clamped portion 41c is formed thick so as to project to the decorative panel 25 side. The thickness of the clamped portion 41c is for example 0.2 mm. Note that, in the figure, the clamped portion 41c is separated from the decorative panel 25, but in actuality, is in close contact with the decorative panel 25.

On the inner edge side of the key sheet 41, an abutment portion 41d is formed which abuts against the mounting surface 39a of the sensor board 39 at a position at the outer circumferential side of the board opening 39h and at the inner circumferential side from the dome switches 45 and the touch sensor electrodes 47. The abutment portion 41d is formed thick so as to project to the sensor board 39 side. The abutment portion 41d is formed in a ring shape to surround the board opening 39h. The abutment portion 41d is formed in a region superimposed on the ring key 7.

A covered portion 41e between the clamped portion 41c and the abutment portion 41d covers the dome switch 45, touch sensor electrode 47, and light emitting element 53. The covered portion 41e is separated from the mounting surface 39a of the sensor board 39 by the function of the abutment portion 41d and the rear case 23 between the clamped portion 41c and the sensor board 39 as spacers.

As shown in FIG. 9A and FIG. 9B, in the covered portion 41e, at the position facing each dome switch 45, a presser 41b for facilitating the depression of the dome switch 45 is formed. The presser 41b is formed thick by projecting to the dome switch 45 side. Note that, as shown in FIG. 10A, a presser 41b is not formed at a position of arrangement of the touch sensor electrode 47.

As shown in FIG. 9A, FIG. 9B, FIG. 10A, and FIG. 10B, the ring key 7 has an exposed surface 7a exposed from the panel opening 25h. As shown in FIG. 6, FIG. 9A, FIG. 10A, and FIG. 10B, the exposed surface 7a has a top surface 7b on the outer circumferential side and an inclined surface 7c on the inner circumferential side. Note that, in FIG. 9B, due to a groove provided in the exposed surface 7a and extended in the radius direction, the top surface 7b and the inclined surface 7c are not shown.

As shown in FIG. 9A, FIG. 9B, FIG. 10A, and FIG. 10B, the top surface 7b is located on the outer portion side of the case (top side of the sheet surface) from the exposed surface 35a of the trim plate 35. The top surface 7b is formed substantially parallel to the back surface 2b of the first housing 2, trim plate 35, sensor board 39, etc. As shown in FIG. 9A and FIG. 9B, the outer edge of the top surface 7b (outer edge of the exposed surface 35a), in other words, the position where the stroke of the top surface 7b is the largest, is located at the center of the presser 41b and dome switch 45.

As shown in FIG. 9A, FIG. 9B, FIG. 10A, FIG. 10B, the inclined surface 7c is located on the outer portion side of the case (top side of the sheet surface) from the exposed surface 35a of the trim plate 35. The inclined surface 7c is inclined so that the inner circumferential side is located on the inner portion side of the case. The inclined surface 7c is, as shown in FIG. 9A, located on the inner circumferential side from the dome switch 45, so force in the direction perpendicular to the inclined surface 7c which is applied to the inclined surface 7c becomes easy to be transmitted to the dome switch 45 side. Note that, the inclined surface 7c can be grasped as a chamfer which is provided in a ridge portion formed by the top surface 7b serving as the exposed surface exposed from the panel opening 25h and the inner circumferential surface of the ring key 7 as well.

Figure 12A:
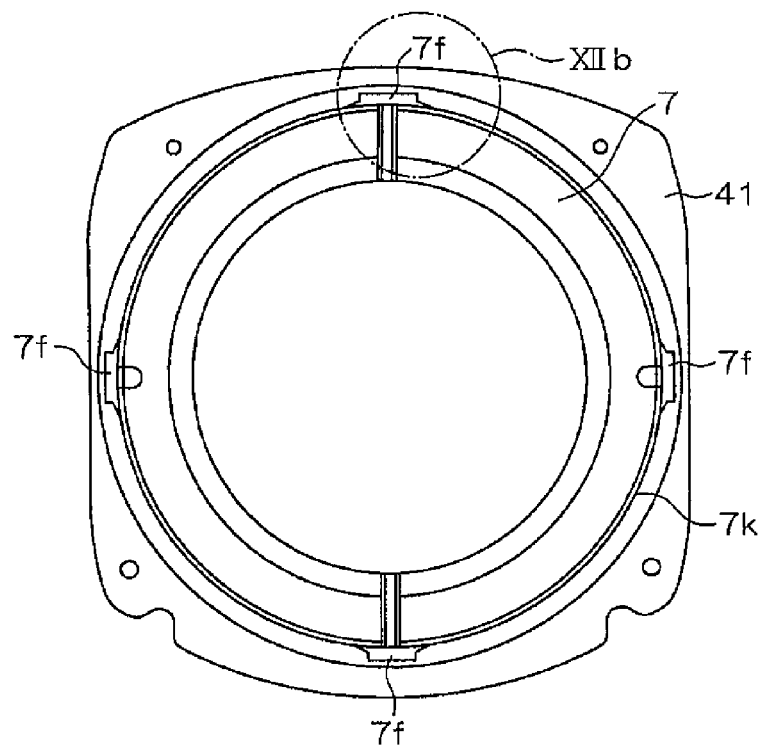
FIG. 12 Views explaining a method of illumination of the ring key in the first housing of FIG. 2.

As shown in FIG. 9A and FIG. 9B, on the outer circumferential side of the ring key 7, a flange 7f projected to the radial direction is formed (see FIG. 12 too). The flange 7f is engaged with the edge portion of the panel opening 25h of the decorative panel 25 from the inner side of the panel and functions as a stopper preventing detachment of the ring key 7 from the panel opening 25h. Flanges 7f are arranged at four positions in the same way as the positions of arrangement of the pressers 41b (dome switches 45) (see FIG. 12A). The pressers 41b are located at positions superimposed on the flanges 7f.

As shown in FIG. 9A, FIG. 9B, FIG. 10A, and FIG. 10B, the surface of the ring key 7 on the inner portion side of the case has a fixed surface 7d on the outer circumferential side and a facing surface 7e on the inner circumferential side. The ring key 7 is fixed with respect to the key sheet 41 by fixing the fixed surface 7d to the covered portion 41e of the key sheet 41 by a binder, two-sided tape, or other fixing means.

The facing surface 7e faces the abutment portion 41d of the key sheet 41. The facing surface 7e is located in a direction separated from the key sheet 41 (top side of the sheet surface) by more than the fixed surface 7d. Namely, on the surface of the ring key 7 facing to the key sheet 41, a step is formed so that the inner circumferential side is separated from the key sheet 41 by more than the outer circumferential side. Further, the facing surface 7e is separated from the key sheet 41 by a predetermined clearance, so preventing depression of the ring key 7 by the abutment portion 41d becomes hard.

The facing surface 7e faces the portion of the trim plate 35 on the outer circumferential side of the exposed surface 35a. In other words, the ring key 7 has a ring-shaped state superimposed portion 7g covering the outer circumferential portion of the exposed surface 35a of the trim plate 35. The facing surface 7e abuts against the exposed surface 35a of the trim plate 35 when the ring key 7 is depressed. Due to this, application of excessive load to the dome switches 45, touch sensor electrodes 47, and light emitting elements 53 through the ring key 7 at the time of depression is prevented.

The exposed surface 35a of the trim plate 35 has a top surface 35b accounting for most of the exposed surface 35a and an inclined surface 35c on the outer circumferential side of the top surface 35b. The top surface 35b is formed in a planar state parallel to the decorative panel 25 and sensor board 39 etc. The inclined surface 35c is inclined so that the outer circumferential side is located on the inner portion side of the case. Note that the inclined surface 35c can be grasped as a chamfer which is provided in a ridge portion formed by the top surface 35b serving as the exposed surface exposed from the panel opening 25h and the inner circumferential surface of the trim plate 35 as well. Against the inclined surface 35c, the facing surface 7e abuts when the ring key 7 is depressed.

As shown in FIG. 10B, the reinforcing frame 31 has an engagement portion 31c (see FIG. 4 as well) which is projected from the rib 31b along the side surface 21c of the front case 21 toward the side surface 21c. On the other hand, on the inner surface of the side surface 21c, an engaged portion 21d which can be engaged with the engagement portion 31c is formed. The engaged portion 21d is formed by formation of a recess in which the projection of the engagement portion 31c is accommodated on the inner surface of the side surface 21c.

The frame assembly 51 is fixed with respect to the front case 21 by engagement of the engagement portion 31c and the engaged portion 21d. At this time, the dust sheet 43 abuts against the periphery of the display surface 29a of the sub-display device 29. Namely, the sub-display device 29 is clamped between the reinforcing frame 31 and the front case 21 by the engagement of the engagement portion 31c with the engaged portion 21d and the fixing of the reinforcing frame 31 with respect to the front case 21.

Figure 11A:
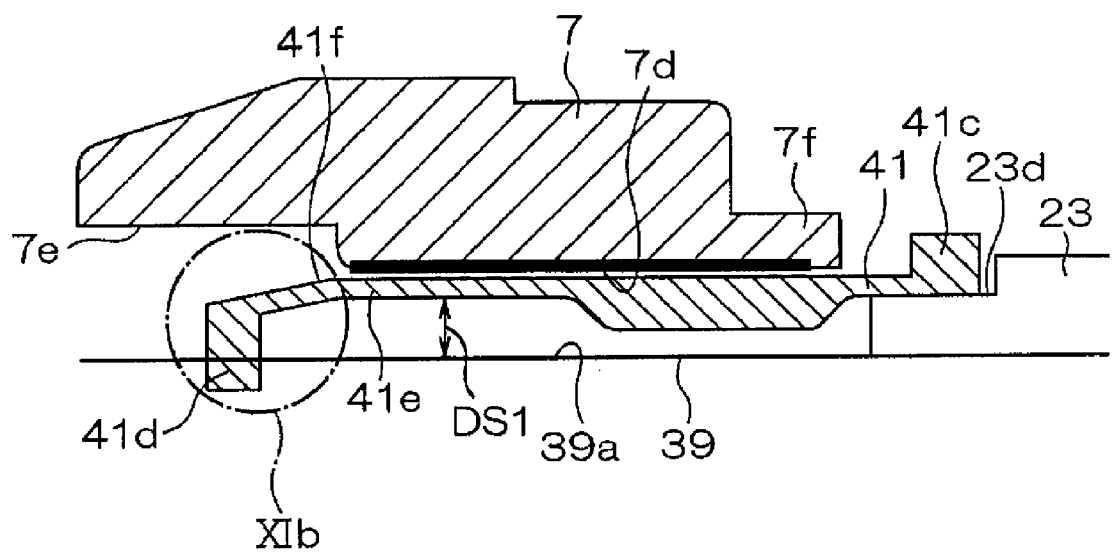
FIG. 11 Views explaining a waterproofing structure at an inner edge of the ring key in the first housing of FIG. 2.
Figure 11B:
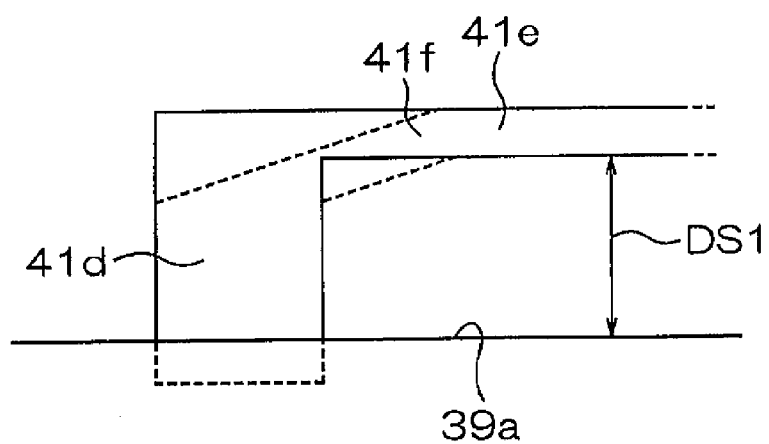

FIG. 11 are views explaining a waterproof structure on the inner circumferential side of the ring key 7, in which FIG. 11A is an enlarged view of the periphery of the ring key 7, and FIG. 11B is a view substantially showing a region XIb of FIG. 11A.

A limit position to the outside direction of the case (upper limit position to the top side of the sheet surface) of the covered portion 41e of the key sheet 41 is defined by the fixed surface 7d of the ring key 7. The limit position to the outside direction of the case (upper limit position to the top side of the sheet surface) of the ring key 7 is defined by the flange 7f.

As shown in FIG. 11A, the key sheet 41 is formed so that the inner circumferential side portion is bent to the sensor board 39 side in the state where the key sheet 41 is not attached to the first housing 2. Specifically, on the covered portion 41e, a bent portion 41f is formed so that the abutment portion 41d is located on the sensor board 39 side. The bent portion 41f is provided, for example, near a border between the fixed surface 7d and the facing surface 7e of the ring key 7.

By the provision of the bent portion 41f, the amount of projection of the abutment portion 41d from the fixed portion of the covered portion 41e to which the fixed surface 7d is fixed becomes larger than a distance DS1 between the upper limit position of the fixed portion and the mounting surface 39a of the sensor board 39.

Accordingly, as indicated by a dotted line in FIG. 11B, the covered portion 41e which had been bent before attachment to the first housing 2, as indicated by a solid line in FIG. 11B, elastically deforms in a direction correcting the bending when attached to the first housing 2 and gives rise to a recovery force. The abutment portion 41d is pressed against the sensor board 39 by using that recovery force as a biasing force.

Note that the amount of projection of the abutment portion 41d from the covered portion 41e and the thickness of the portion clamped between the clamped portion 41c and the sensor board 39 in the rear case 23 are set equal to the distance DS1. Therefore, when the key sheet 41 is attached to the first housing 2, the covered portion 41e becomes substantially a planar state.

As shown in FIG. 4 and FIG. 10A, a plate portion 31a of the reinforcing frame 31 is provided with recesses 31d at positions superimposed with the touch sensor electrodes 47. The recesses 31d are selectively provided corresponding to those of the plurality of touch sensor electrodes 47 close to which electronic components are arranged. FIG. 4 illustrates a case where the recesses 31d are formed corresponding to the touch sensor electrode 47 on the right side of the sheet surface and the touch sensor electrode 47 on the left side of the sheet surface. Note that the recesses 31d may be provided correspondingly to all of the touch sensor electrodes 47 as well.

Each recess 31d is formed by providing a hollow in the surface of the plate portion 31a of the reinforcing frame 31 on which the sensor board 39 is placed. The interior of the recess 31d forms a cavity in which air exists. Note that the resin forming the reinforcing frame 31 has a dielectric constant (for example 2.0 to 6.0) larger than the dielectric constant of air (about 1.0). Accordingly, in the reinforcing frame 31, the region superimposed on the touch sensor electrode 47 becomes lower in dielectric constant in comparison with the other regions, so it becomes hard for a change of the electric capacitance at the reinforcing frame 31 on the opposite side to the touch sensor electrode 47 to cause a change in the electric capacitance on the touch sensor electrode 47 side.

At positions on the display board 27 superimposed with the recesses 31d, electronic components are arranged. The electronic components include metal members and other members having a relatively high dielectric constant. In FIG. 4, as electronic components, a case where a connector 67 (see FIG. 3 as well) is provided at a position superimposed on the recess 31d on the right side of the sheet surface, and an IC 69 is provided at a position superimposed on the recess 31d on the left side of the sheet surface is exemplified. In FIG. 10A, the connector 67 is exemplified as an electronic component. The connector 67 is one for electric connection of the display board 27 and a not shown circuit board of the second housing 3. A not shown signal line extending from the circuit board of the second housing 3 is connected with the connector 67.

As shown in FIG. 10A, the connector 67 is provided at a position facing the housing opening 2h (case opening 23h and/or panel opening 25h). Further, the connector 67 is covered by a support member 71. The support member 71 is a member having a lower dielectric constant than the reinforcing frame 31 and the connector 67. The thickness of the portion sandwiched between the connector 67 and the reinforcing frame 31 in the support member 71 is equal to the distance between the connector 67 and the reinforcing frame 31 in a case where no weight is applied upon the reinforcing frame 31. Accordingly, even when the sensor board 39 and the reinforcing frame 31 are bent to the display board 27 side by depression of the ring key 7, the support member 71 functions as a spacer, so the distance between the touch sensor electrode 47 and the connector 67 is held constant. Note that the support member 71 may be supported upon the display board 27 not via the connector 67 as well.

Figure 12B:
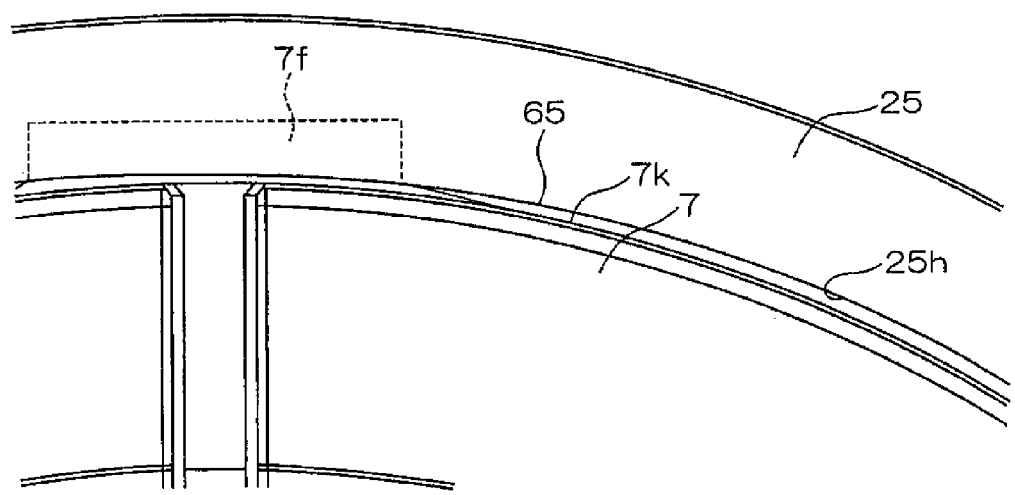

FIG. 12 are views explaining a method of illumination of the ring key 7 by the light emitting elements 53, in which FIG. 12A is a plan view of the ring key 7 and key sheet 41, and FIG. 12B is an enlarged view of a region XIIb of FIG. 12A in a state where the ring key 7 is exposed from the panel opening 25h.

Each light emitting element 53 is constituted by for example an LED. As shown in FIG. 10A, the light emitting element 53 is arranged at a position that superimposed with the ring key 7. The ring key 7 and the decorative panel 25 are formed by materials not having light transmission properties and/or coated by a paint not having a light transmission property. The key sheet 41 is formed by a light transmitting material. The light from the light emitting element 53 is guided through the key sheet 41 from a clearance 65 between an outer edge 7k of the ring key 7 and the panel opening 25h to the outside of the first housing 2.

As shown in FIG. 12B, the clearance 65 is formed to become narrower as it approaches the flange 7f. For example, the outer edge 7k of the ring key 7 (inner edge of the clearance 65) is a perfect circle in a region other than that where the flange 7f is provided. In contrast, however, as shown in FIG. 12A, the shape of the panel opening 25h (outer edge of the clearance 65) is not a perfect circle, but is set so that the diameter becomes smaller as it approaches the flange 7f. Note that, at a position separated from the flange 7f to a certain extent, the clearance 65 may be held to a constant width as well.

Figure 13:
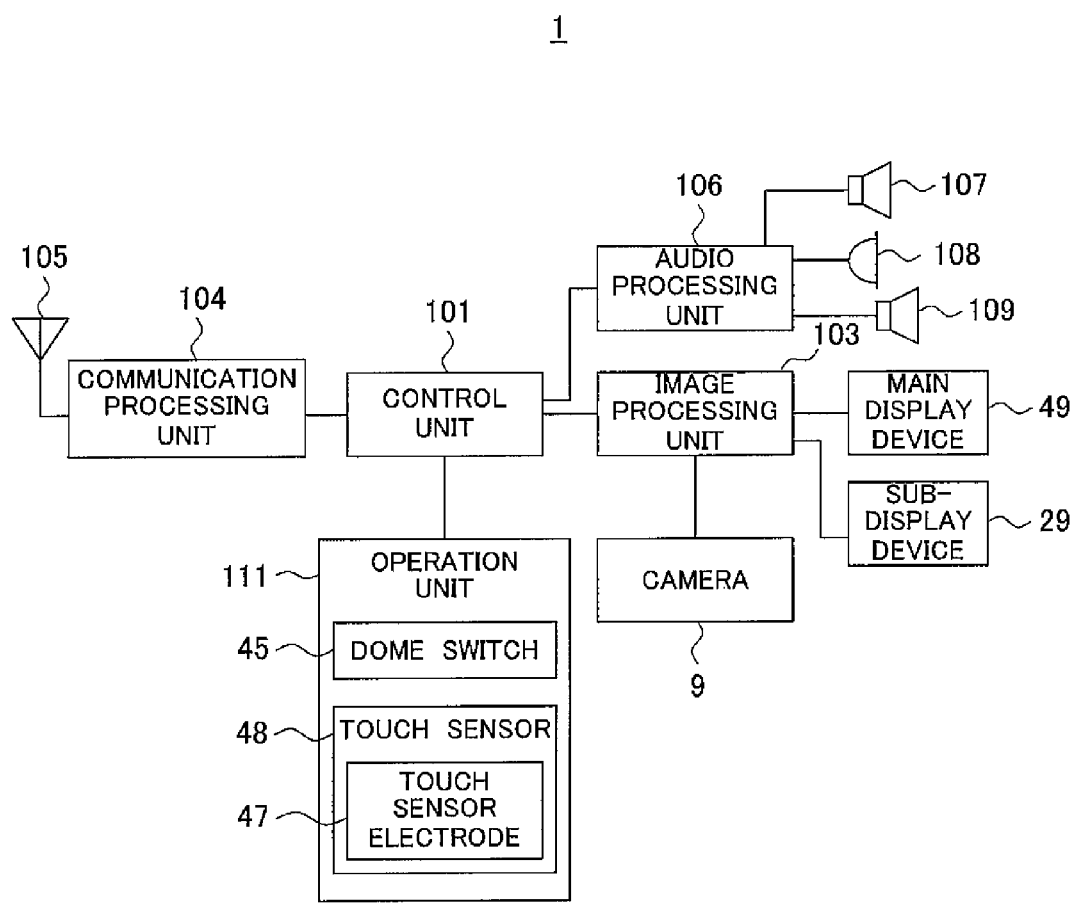
FIG. 13 A block diagram showing the configuration of a signal processing system of the mobile phone of FIG. 1.

FIG. 13 is a block diagram showing an example of the configuration of a signal processing system of the mobile phone 1.

The mobile phone 1 is provided with a control unit 101, communication processing unit 104, audio processing unit 106, and image processing unit 103.

The control unit 101 receives as input signals from an operation unit 111 and various other means, performs predetermined processing based on those signals, and outputs a control signal and various other signals for controlling operations of the image processing unit 103, communication processing unit 104, audio processing unit 106, and various other means to the various means.

The communication processing unit 104 includes a high frequency wave circuit and performs wireless communications utilizing electric waves by modulating audio data, image data, and other various types of data processed at the control unit 101 and transmitting the results through an antenna 105. Further, the communication processing unit 104 demodulates signals received through the antenna 105 and outputs the results to the control unit 101.

The audio processing unit 106 converts audio data from the control unit 101 to audio signals and outputs the signals to a speech-use speaker 107 and an announcement and music playback speaker 109 (see FIG. 4 as well). The audio processing unit 106 converts audio signals from the microphone 108 to audio data and outputs the data to the control unit 101.

The image processing unit 103 converts image data from the control unit 101 to image signals and outputs the signals to the main display device 49 and the sub-display device 29. Further, the image processing unit 103 converts captured signals (image data) output from the camera 9 to image data having a predetermined format and outputs the result to the control unit 101.

The operation unit 111 includes the dome switches 45 and the touch sensor electrodes 47. Each dome switch 45, as explained above, outputs an ON signal by the abutment of the movable contact 45a against the fixed contact 45c when depressed through the ring key 7. Each touch sensor 48 including a touch sensor electrode 47, as explained above, outputs a signal in accordance with the change of the electrostatic capacitance due to the approach or contact of the finger of the user to the ring key 7. Note that this signal may be output as the ON signal when the electrostatic capacitance exceeds a predetermined threshold value or may be a signal having a continuous or stepwise levels in proportion to the magnitude of the electrostatic capacitance.

The plurality of dome switches 45 and touch sensor electrodes 47 are arranged on the circumference along the ring key 7, therefore the control unit 101 can specify the position of the finger of the user on the ring key 7 based on the signals from the dome switches 45 and touch sensor electrodes 47.

For example, when the ON signal is output from any one of the dome switches 45 arranged in four directions (for example, top, bottom, left, and right), it is identified that the position in one direction among those four directions is depressed. When ON signals are output from two adjacent dome switches 45 arranged in four directions (for example, top, bottom, left, and right), it is identified that a position in one direction among four directions (oblique directions) between the four directions described before is depressed.

In the same way, when an ON signal is output from any one of the touch sensor electrodes 47 arranged in four directions (for example, top, bottom, left, and right), it is identified that the finger of the user touches the position in one direction among those four directions. When ON signals are output from two adjacent touch sensor electrodes 47 arranged in the four directions (for example, top, bottom, left, and right), it is identified that the finger of the user touches the position in one direction among four directions (oblique directions) between the four directions described before.

The control unit 101, further, by recording the history of the position of the finger of the user which is identified, can identify the change of the position of the finger of the user over time. For example, a rotation operation where the user slides his finger along the ring key 7 to continuously move the finger, that is, an operation of tracing the outline of the ring key 7, can be identified. Due to this, in accordance with the number of times or angle by which the finger is continuously moved around the ring key 7, for example, the volume of the output from the speaker 109 can be increased or decreased, the luminance of the sub-display device 29 can be increased/decreased, or the displayed content of the sub-display device 29 can be changed in a predetermined cycle.

Note that the control unit 101 processes signals from the touch sensor electrodes 47 and the dome switches 45 so as to discriminate between a simple contact operation where the finger only contacts the ring key 7, but the key is not depressed and a depression operation (naturally including contact as well).

Namely, when an ON signal is output from only a touch sensor electrode 47, but no ON signal is output from a dome switch 45, the control unit 101 judges the operation to be a simple contact one, while when an ON signal is output from a dome switch 45 (and touch sensor electrode 47), the control unit 101 judges the operation to be depression, so the control unit 101 can make control signals corresponding to the two operations different from each other.

According to the above embodiment, an electronic device giving an integrated feeling to the display and operating member can be provided.

Namely, the device is provided with the first housing 2 having the housing opening 2h, the sub-display device 29 provided in the first housing 2 and having the display surface 29a exposed from the housing opening 2h, the reinforcing frame 31 arranged between the housing opening 2h and the sub-display device 29, having the frame opening 31h for exposing the display surface 29a to the housing opening 2h side, and fixed to the first housing 2, the trim plate 35 fixed to the surface facing the housing opening 2h in the reinforcing frame 31, covering the frame opening 31h, and arranged in the housing opening 2h, the sensor board 39 arranged on the surface facing the housing opening 2h of the reinforcing frame 31 and having the board opening 39h into which the trim plate 35 is inserted, dome switches 45 provided on the mounting surface 39a facing the housing opening 2h of the sensor board 39, and the ring-shaped ring key 7 exposed from the clearance between the housing opening 2h and the trim plate 35 and arranged at a position superimposed with the dome switches 45, so the sub display 5 including the sub-display device 29 and the trim plate 35 and the ring key 7 are exposed from the same opening (housing opening 2h) and the integral feeling between the sub-display 5 and the ring key 7 increases. Further, the dome switches 45 are provided at positions superimposed with the ring key 7, therefore there is a "click" feeling in comparison with the case where the touch panel is provided on the sub-display device 29, so operation is easy. The reinforcing frame 31 not only supports the trim plate 35, but also supports the sensor board 39 to which a force pressing against the dome switches 45 is applied and is commonly used for reinforcing the strength of the sensor board 39, therefore a reduction of size of the mobile phone 1 is achieved. The reinforcing frame 31 has a relatively wide area covering the display board 27, therefore it is commonly used for reinforcing the strength of the display board 27 as well.

The sub-display device 29 is clamped between the surface of the first housing 2 opposite to the surface provided with the housing opening 2h (inner side surface of the front case 21) and the reinforcing frame 31, therefore the reinforcing frame 31 is commonly used for holding and reinforcing the sub-display device 29, and a reduction of size of the mobile phone 1 is achieved. Further, by enabling the reinforcing frame 31 to be fixed to the front case 21 by the engagement portion 31c and the engaged portion 21d provided on the front case 21, the sub-display device 29 and the reinforcing frame 31 can be fixed to the front case 21 before combining the front case 21 and the rear case 23, so the assembly process is facilitated. Between the display surface 29a of the sub-display device 29 and the reinforcing frame 31, a dust sheet 43 made of an elastic member is interposed, therefore the sub-display device 29 can be reliably clamped with a predetermined pressing force without scratching the sub-display device 29, and entry of water and dust into the display surface 29a is prevented.

The device further has the touch sensor electrodes 47 provided on the mounting surface 39a facing the housing opening 2h of the sensor board 39 and arranged at positions superimposed with the ring key 7. Therefore, not only the depression operation of the ring key 7, but also an operation making the finger approach or contact the ring key 7 become possible.

A plurality of dome switches 45 are provided to surround the board opening 39h, a plurality of touch sensor electrodes 47 are provided to surround the board opening 39h, and the dome switches 45 and the touch sensor electrodes 47 are alternately arranged in the circumferential direction of the board opening, therefore the operation of tracing the outline of the ring key 7 becomes possible, and the "click" feeling by the tact switch can be given to this operation. Namely, by the provision of the ring key 7 surrounding the sub-display 5 as the operating member, not only is the integral feeling of the operating member and the display improved, but also the operation method is diversified and the operability is improved by making the operation member sufficiently exhibit the function as a ring key.

The device is further provided with the light emitting elements 53 provided on the mounting surface 39a facing the housing opening 2h of the sensor board 39 and a clearance 65 capable of transmitting the light from the light emitting elements 53 to the outside of the first housing 2 is formed between the ring key 7 and the housing opening 2h, therefore the inner edge of the ring key 7 can be visually confirmed by the light from the sub-display 5, and the outer edge of the ring key 7 can be visually confirmed by the light from the light emitting elements 53. Therefore, the operability at night can be improved while suppressing the increase of the number of parts.

The light emitting elements 53 are arranged at positions superimposed with the ring key 7, therefore a region in the mounting surface 39a of the sensor board 39 which is superimposed on the ring key 7 is effectively utilized, and the mobile phone 1 can be reduced in size.

The ring key 7 has a plurality of flanges 7f as stoppers which can be engaged with the edge of the housing opening 2h in the first housing 2 from the internal side of the case. The clearance 65 between the ring key 7 and the housing opening 2h is formed so that the clearance 65 becomes narrower as it approaches the plurality of flanges 7f, therefore the light from the light emitting elements 53 will be gradually reduced in the amount as it approaches the flanges 7f, so the portions blocked by the flanges 7f do not stand out.

Further, according to the above embodiment, an electronic device having a high degree of freedom of design and high waterproof property or dust prevention property can be provided.

Namely, the device has a third housing 2' constituted by the rear case 23 having the case opening 23h and the front case 21, the decorative panel 25 having the panel opening 25h and placed over the third housing 2' so that the panel opening 25h is superimposed with the case opening 23h, the reinforcing frame 31 provided in the third housing 2', the trim plate 35 fixed to the surface facing the housing opening 2h of the reinforcing frame 31 and arranged in the case opening 23h and the panel opening 25h, the sensor board 39 provided on the surface facing the case opening 23h of the reinforcing frame 31 and having the board opening 39h in which the trim plate 35 is inserted, the touch sensor electrodes 47 provided on the mounting surface 39a facing the case opening 23h of the sensor board 39, the key sheet 41 provided on the surface facing the case opening 23h of the sensor board 39 to cover the touch sensor electrodes 47 and having the sheet opening 41h having a smaller diameter than the case opening 23h and the panel opening 25h and in which the trim plate 35 is inserted, and the ring-shaped ring key 7 provided at a position superimposed with the touch sensor electrodes 47 on the surface facing the case opening 23h of the key sheet 41 and exposed from the clearance between the panel opening 25h, and, the case opening 23h and the trim plate 35, wherein the key sheet 41 has the ring-shaped clamped portion 41c which is clamped by the third housing 2' and the decorative panel 25 and surrounds the case opening 23h and the panel opening 25h; and the ring-shaped abutment portion 41d which abuts against the mounting surface 39a facing the case opening 23h of the sensor board 39 at the position on the inner circumferential side from the touch sensor electrodes 47 to surround the board opening 39h. Therefore, water and dust entering through the clearance between the panel opening 25h and the outer edge of the ring key 7 are stopped by the clamped portion 41c at the two positions of between the key sheet 41 and decorative panel 25 and between the key sheet 41 and rear case 23, while water and dust invading through the clearance between the trim plate 35 and the inner edge of the ring key 7 are stopped by the abutment portion 41d between the key sheet 41 and the sensor board 39. Namely, water and dust entering through the inner edge and outer edge of the ring key 7 are stopped by the key sheet 41 and cannot enter the internal portion of the third housing 2'. As a result, it becomes possible to form a clearance between the ring key 7 and the trim plate 35 and between the ring key 7 and the panel opening 25h, the ring key 7 can be formed by a member movable with respect to the trim plate 35 and the decorative panel 25, and it becomes possible to transmit light from the light emitting elements 53 through the clearance between the ring key 7 and the decorative panel 25. Note that by fixing the trim plate 35 and the reinforcing frame 31 by two-sided tape 33 or other contact fixing means, entry of water and dust between the two members is prevented, while by fixing the sensor board 39 and the reinforcing frame 31 by two-sided tape 37 or other contact fixing means, entry of water and dust between the two members is prevented. Further, because of the structure of attaching the key sheet 41 to the case by clamping the outer circumferential portion of the key sheet 41, the key sheet 41 can be made thinner in comparison with conventional ones. By appropriately arranging the reinforcing frame 31 in an unused space inside the first housing 2', the strength of the first housing 2' can be improved as well without increasing the thickness of the first housing 2'.

The key sheet 41 is provided with positioning holes 41a, while the rear case 23 is provided with positioning projections 23c to be inserted in the positioning holes 41a, therefore the assembly is facilitated and deviation of the key sheet 41 by the operation of the ring key 7 is prevented.

The key sheet 41 is bent so that the inner circumferential side is located nearer the sensor board 39 side than the outer circumferential side when the key sheet 41 is not attached to the third housing 2'. When the key sheet 41 is attached to the third housing 2', the force received by the abutment portion 41*d* from the sensor board 49 causes the key sheet 41 to elastically deform in a direction correcting the bending and the key sheet 41 generates a biasing force pressing the abutment portion 41*d* against the sensor board 39, therefore a contact pressure between the abutment portion 41*d* and the sensor board 39 is raised and entry of water and dust can be prevented more reliably. Further, in comparison with a case where a not bent key sheet is attached while making the sheet elastically deform so that the sheet will project out to the sensor board 39 side by the force received at the abutment portion from the sensor board 39 and thereby cause a biasing force, it is easy to secure a movable range at the time of a depression operation of the ring key 7.

The abutment portion 41*d* is provided to project to the sensor board 39 side at a position superimposed with the ring key 7. The surface which faces the key sheet 41 of the ring key 7 has a fixed surface 7*d* which is provided on the outer circumferential side from the abutment portion 41*d* and is fixed to the key sheet 41 and a facing surface 7*e* which is provided on the inner circumferential side of the fixed surface 7*d* and faces the abutment portion 41*d* at the position separated from the key sheet 41 by more than the fixed surface 7*d*, therefore it is not necessary to secure a space for providing the abutment portion 41*d* outside the arrangement region of the ring key 7 and depression of the ring key 7 is not prevented either.

The sub-display device 29 is provided on the opposite side to the case opening 23*h* with respect to the reinforcing frame 31, the reinforcing frame 31 is provided with the frame opening 31*h* transmitting the light from the sub-display device 29 to the case opening 23*h* side, and the decoration member which is arranged in the case opening 23*h* and the panel opening 25*h* is the trim plate 35 serving as the light transmission member covering the frame opening 31*h*, therefore an electronic device having a high waterproof property and antidust property and giving an integral feeling between the display and the operating member can be provided.

On the mounting surface 39*a* facing the housing opening of the sensor board 39, dome switches 45 serving as the tact switches provided at positions superimposed on the ring key 7 are further provided. The key sheet 41 has projection-shaped pressers 41*b* between the ring key 7 and the dome switches 45. Namely, the key sheet 41 is not just a waterproof sheet, but is preferably commonly used as the sheet making the depression operation of the dome switches 45 possible by the depression operation of the ring key 7, so a decrease of number of members and a reduction of the thickness of the mobile phone 1 are achieved.

The ring key 7 has flanges 7*f* which can be engaged with the edges of the panel opening 25 in the decorative panel 25 from the inside of the decorative panel, while the pressers 41*b* are provided at positions superimposed with the flanges 7*f*, therefore the portion for depressing the pressers 41*b* is secured by the flanges 7*f*, and the diameter of the ring key 7 can be made smaller.

Further, according to the above embodiment, an electronic device able to be reduced in size and improved in the sensing ability of the sensor can be provided.

Namely, the devise has the first housing 2 having the housing opening 2*h*, the display board 27 arranged to face the housing opening 2*h* in the first housing 2, electronic components (IC 69 or connector 67) arranged on the surface facing the housing opening 2*h* of the display board 27, the reinforcing frame 31 arranged on the surface facing the housing opening 2*h* of the display board 27 to cover those electronic components, the sensor board 39 arranged on the surface facing the housing opening 2*h* of the reinforcing frame 31, and the touch sensor electrodes 47 provided on the surface facing the housing opening 2*h* of the sensor board 39 and detecting the electrostatic capacitance along with the approach or separation of an object to or from the housing opening 2*h* side, wherein the reinforcing frame 31 has the plate portion 31*a* having a surface facing the display board 27 and separated from the display board 27 by a distance not less than the thickness of the electronic components and a surface abutting against the sensor board 39 and the recesses 31*d* are formed on the surface abutting against the sensor board 39 of the plate portion 31*a* in the region superimposed with the touch sensor electrodes 47 and the electronic components, therefore the dielectric constant of the internal portion of the recesses 31*d* can be lowered from the dielectric constant of the reinforcing frame 31, and the influence of electronic components upon the touch sensor electrodes 47 can be reduced. As a result, it also becomes possible to arrange electronic components close to the touch sensor electrodes 47 and a reduction of size is achieved.

The device further has the dome switches 45 provided on the surface facing the housing opening 2*h* of the sensor board 39 and the ring-shaped ring key 7 which is exposed from the housing opening 2*h* and is superimposed with the dome switches 45 and touch sensor electrodes 47. The region superimposed with the dome switches 45 of the reinforcing frame 31 is located at a position where no recesses 31*d* are arranged, therefore a click feeling can be given to the operation peculiar to the touch sensor for example tracing of the ring key 7, and the bending at the time of the depression operation at the position of arrangement of the dome switches 45 is suppressed, so the drop of sensitivity of the dome switches 45 can be suppressed.

Further, according to the above embodiment, an electronic device having a ring-shaped operating member having high design property and operability can be provided.

Namely, the device has the first housing 2 having the housing opening 2*h*, the trim plate 35 as the decorative member arranged in the housing opening 2*h*, and the ring-shaped ring key 7 arranged between the housing opening 2*h* and the trim plate 35; the inclined surface 7*c* is provided as a C surface, an R surface, or other chamfer at the ridge portion between the exposed surface (top surface 7*b*) of the ring key 7 exposed from the housing opening 2*h* and the inner circumferential surface of the ring key 7; and the inclined surface 7*c* is located on the outer side of the case from the exposed surface 35*a* exposed from the housing opening 2*h* in the trim plate 35, therefore the decorative member is arranged on the inner circumferential side of the ring key 7 and the design property is improved. Further, by making a finger abut against the inclined surface 7*c*, the operation of tracing the ring key 7 can be carried out while applying a force from the inside to the outside of the ring key 7 and a force pushing the ring key 7 to the inner side of the case, so the operability of the circling operation and depression operation etc. is improved. The inclined surface 7*c* is located at the outer portion side of the case from the exposed surface 35*a* of the trim plate 35, therefore the position of the ring key 7 can be grasped by the sense of touch. Further, it is hard for the finger to abut against the trim plate 35, so the trim plate 35 is resistant to deposition of dirt.

The ring key 7 has the ring-shaped superimposed portion 7*g* covering the outer circumferential portion of the exposed surface 35*a* of the trim plate 35, therefore exposure of the inside of the case through the clearance between the trim plate

35 and the ring key 7 is prevented, entry of water and dust is prevented, and the design property is improved.

At the ridge portion formed by the exposed surface 35*a* and the outer circumferential surface of the trim plate 35, the inclined surface 35*c* serving as a C surface, R surface, or other chamfer is formed which abuts against the superimposed portion 7*g* when the ring key 7 is depressed, therefore the feeling when the ring key 7 abuts against the trim plate 35 becomes milder and the operability is improved.

The device further has the sensor board 39 provided in the first housing 2, dome switches 45 and touch sensor electrodes 47 provided at the surface facing the housing opening 2*h* of the sensor board 39, and the key sheet 41 arranged on the mounting surface 39*a* facing the housing opening 2*h* of the sensor board 39 to cover the dome switches 45 and touch sensor electrodes 46 and having projection-shaped pressers 41*b* at positions facing the dome switches 45, and the ring key 7 is provided at a position superimposed with the dome switches 45 and touch sensor electrodes 47 on the surface facing the housing opening 2*h* of the key sheet 41, therefore the diversification of the operation method of the ring key 7 and the improvement of the operability are achieved. For example, a click feeling can be given to the operation of tracing the outline of the ring key 7.

The trim plate 35 is a light transmission member transmitting the light from the sub-display device 29 provided inside the first housing 2 therethrough, therefore an electronic device having a high operability and giving an integral feeling between the display and the operating member can be provided.

Note that, in the above embodiment, the mobile phone 1 is an example of the electronic device of the present invention, the third housing 2' or first housing 2 is an example of the case member of the present invention, the housing opening 2*h* or case opening 23*h* is an example of the opening of the present invention, the display board 27 is an example of the second circuit board of the present invention, each of the connector 67 and the IC 69 is an example of the electronic component of the present invention, the reinforcing frame 31 is an example of the frame member of the present invention, the sensor board 39 is an example of the first circuit board of the present invention, the touch sensor electrode 47 is an example of the electrode of the present invention, each of the movable contact 45*a* and the fixed contact 45*c* of the dome switch 45 is an example of the switch member of the present invention, and the ring key 7 is an example of the operating member of the present invention.

The present invention is not limited to the above embodiment and may be executed in various ways.

The electronic device of the present invention is not limited to a mobile phone. For example, it may be a digital camera, a notebook personal computer, a PDA (Personal Digital Assistant), or a printer as well.

The tact switch (tactile switch, tactile feedback push switch) may be any one giving a click feeling along with the depression operation and is not limited to a dome switch. The tact switch may be a mechanical contact type using a metal material for the movable contact or may be an elastic contact type using electrically conductive rubber. Further, it may be one having a hysteresis feeling.

The touch sensor electrode and the touch sensor including the touch sensor electrode may be any ones able to detect the approach or contact of a finger or other portion of a human body or an electronic pen or other operating member. For example, it may be an electromagnetic induction type as well.

The operating member (operation unit) is not limited to a ring-shaped one. Further, the ring-shaped operating member need only be one having an opening to expose a decorative member etc. and is not limited to a circular one. For example, it may be elliptical or polygonal as well. Further, the sectional shape of the operating member may be appropriately set as well. From the opening of the ring-shaped operating member, an appropriate decorative member can be exposed. For example, it may be a simple decorative-use panel or may be another operating member.

The sheet member (key sheet 41) may be directly clamped by the case member (rear case 23) and the cover member (decorative panel 25) as in the embodiment or may be indirectly clamped through another member. For example, a waterproof member (first contact member) contacting the sheet member and the cover member may be provided between the sheet member and the cover member, and a waterproof member (second contact member) contacting the sheet member and the case member may be provided between the sheet member and the case member. In this case, the contacting property with the sheet member, cover member, etc. is improved, so the waterproof effect becomes higher. The waterproof member is constituted by a sheet having elasticity, for example, rubber or a two-sided tape.

The engagement portions (positioning projections) engaged with the engaged portions (positioning holes 41*a*) of the sheet member (key sheet 41) are not limited to ones provided in the case member (rear case 23) and may be provided in the cover member (decorative panel 25) as well or be provided in both of the case member and the cover member. Note that in a case where a relief shape pattern is formed over the entire surface facing the case member of the cover member, it is difficult to provide positioning projections on this surface, therefore preferably the projections are provided at the case member as in the embodiment.

In a case where the sheet member (key sheet 41) is formed bent so that the inner circumferential side is located on the sensor board side, the sheet member is not limited to a bent one and may be a curved one as well.

The recess (31*d*) for lowering the dielectric constant of the plate portion of the frame member (reinforcing frame 31) is not limited to one provided in the surface facing the sensor board on which the touch sensor electrodes are provided and may be one provided in the back surface thereof as well. Further, the recess is not limited to one superimposed with both of the touch sensor electrode and the electronic component and may be one superimposed with either the touch sensor electrode or electronic component.

Further, in the inside of the recess (31*d*) of the frame member (reinforcing frame 31), a solid (not hollow) member having a smaller dielectric constant than that of the material forming the frame member may be arranged in place of the cavity (air layer). In this case, the drop of the strength of the frame member due to the provision of the recess is suppressed. Accordingly, bending deformation of the sensor board (39) and frame member at the time of the depression operation are suppressed. The solid member is for example made of a resin, glass, asbestos, or fabric.

In the solid member described above, preferably the outwardly exposed surface forms the same plane as the surface on which the sensor board is placed in the plate portion (31*a*) of the frame member (reinforcing frame 31). In this case, minute deformation of the sensor board (39) to the inside of the recess (31*d*) due to its own weight is prevented, and the distance between the touch sensor electrode (47) of the sensor board and the ring-shaped operating member (ring key 7) can be held constant, so the sensitivity of the touch sensor can be maintained.

The chamfers (inclined surface 7c, inclined surface 35c) of the ring-shaped operating member (ring key 7) and the decorative member (transparent member, trim plate 35) may be given various chamfer-shapes and are not limited to flat planes (C surface). For example, they may be R surfaces as well.

The invention claimed is:

1. An electronic device comprising:
a case member having an opening;
an electronic component arranged inside the case member;
a frame member arranged to face the opening to cover the electronic component;
a first circuit board arranged on a surface facing the opening of the frame member; and
an electrode for an electrostatic capacity type touch sensor provided on a surface facing the opening of the first circuit board,
wherein the frame member has a recess in a region corresponding to at least one of the electrode and the electronic component.

2. An electronic device as set forth in claim 1, wherein
the frame member is formed by a resin, and
a solid member having a smaller dielectric constant than that of the frame member is arranged in the recess.

3. An electronic device as set forth in claim 2, wherein
the recess is formed in the surface on the side where the first circuit board is arranged of the frame member, and
the solid member is arranged so that its surface becomes the same plane as the surface of the frame member.

4. An electronic device as set forth in claim 1, further comprising:
a switch member arranged on the surface facing the opening of the first circuit board and
an operating member arranged to be exposed from the opening and arranged to face the switch member and the electrode, wherein
the recess is arranged in a region which does not correspond to the switch member of the frame member.

5. An electronic device as set forth in claim 1, wherein
the frame member has a plate portion which is arranged separated from the electronic component to the opening side, and
the recess is formed in the plate portion.

6. An electronic device as set forth in claim 5, wherein the recess is formed at a position corresponding to the electrode on a surface on the side facing the opening of the plate portion.

7. An electronic device as set forth in claim 5, wherein the recess is formed at a position corresponding to the electronic component on a surface on the side facing the electronic component of the plate portion.

8. An electronic device as set forth in claim 1, comprising:
the device has a second circuit board which is arranged inside the case member and has the electronic component arranged at a position facing the opening, wherein
the frame member is arranged on a surface on the side facing the opening of the second circuit board.

* * * * *